United States Patent
Yuzuki

(10) Patent No.: US 7,778,136 B2
(45) Date of Patent: Aug. 17, 2010

(54) OPTICAL RECORDING MEDIUM DRIVING APPARATUS AND FOCUSING METHOD

(75) Inventor: Shinichi Yuzuki, Kanagawa (JP)

(73) Assignee: Sony NEC Optiarc Inc, Tokyo (JP)

( * ) Notice: Subject to any disclaimer, the term of this patent is extended or adjusted under 35 U.S.C. 154(b) by 477 days.

(21) Appl. No.: 11/981,430

(22) Filed: Oct. 31, 2007

(65) Prior Publication Data

US 2008/0137493 A1 Jun. 12, 2008

(30) Foreign Application Priority Data

Nov. 8, 2006 (JP) .............................. 2006-302740

(51) Int. Cl.
*G11B 7/00* (2006.01)

(52) U.S. Cl. .................... 369/94; 369/44.27; 369/44.29; 369/53.28

(58) Field of Classification Search ................... 369/94, 369/44.25, 44.27, 44.28, 44.29, 44.32, 53.28
See application file for complete search history.

(56) References Cited

U.S. PATENT DOCUMENTS

| | | | | |
|---|---|---|---|---|
| 7,145,846 | B2 * | 12/2006 | Ando | 369/44.26 |
| 2006/0262676 | A1 * | 11/2006 | Han | 369/44.11 |
| 2007/0159951 | A1 * | 7/2007 | Sagara | 369/106 |
| 2007/0183278 | A1 * | 8/2007 | Yamada et al. | 369/44.29 |
| 2007/0189131 | A1 * | 8/2007 | Kuze et al. | 369/94 |
| 2008/0056077 | A1 * | 3/2008 | Miyaoka | 369/44.23 |
| 2008/0219131 | A1 * | 9/2008 | Hendriks et al. | 369/112.23 |

FOREIGN PATENT DOCUMENTS

| | | |
|---|---|---|
| JP | 10-269611 A | 10/1998 |
| JP | 2000-131603 A | 5/2000 |
| JP | 2002-157750 A | 5/2002 |
| JP | 2003-016660 A | 1/2003 |
| JP | 2003-022545 A | 1/2003 |
| JP | 2004-039125 A | 2/2004 |
| JP | 2006-155792 A | 6/2006 |

* cited by examiner

*Primary Examiner*—Thang V Tran
(74) *Attorney, Agent, or Firm*—Wolf, Greenfield & Sacks, P.C.

(57) ABSTRACT

An optical recording medium driving apparatus supporting an optical recording medium having multiple recording layers includes head means including a focusing mechanism and a spherical aberration correction mechanism; focusing control means for driving the focusing mechanism on the basis of a reflected light to perform focusing control on each recording layer; spherical aberration correcting means for driving the spherical aberration correction mechanism on the basis of a spherical aberration correction value to correct spherical aberration; and control means for controlling the focusing control means so as to set the spherical aberration correction value given by shifting the spherical aberration correction value appropriate for the midpoint between a target layer and a first recording layer by a desired value in the spherical aberration correcting means and controlling the focusing control means so as to perform the focusing control with the spherical aberration correction value after the shift being set.

7 Claims, 14 Drawing Sheets

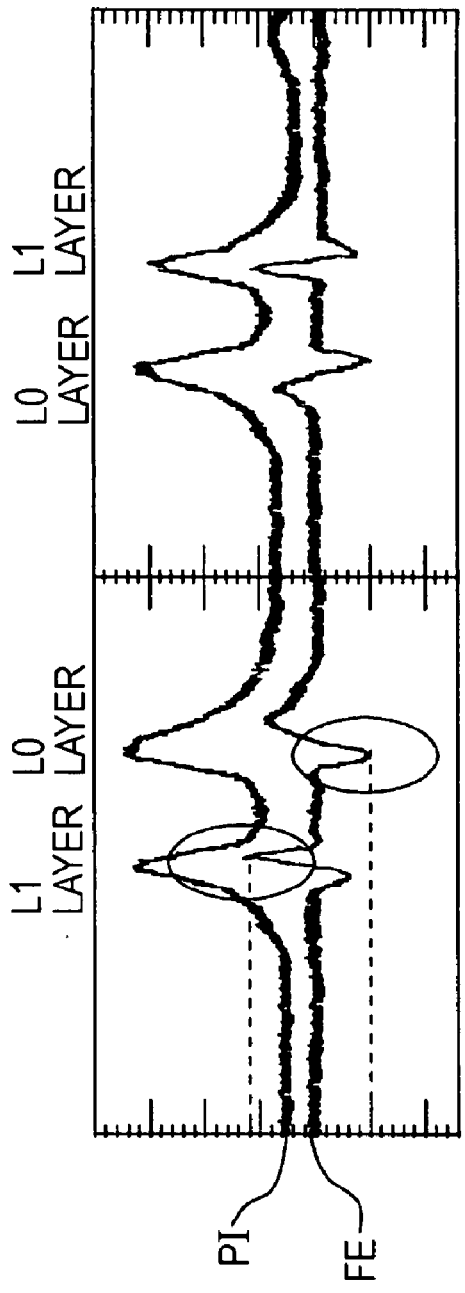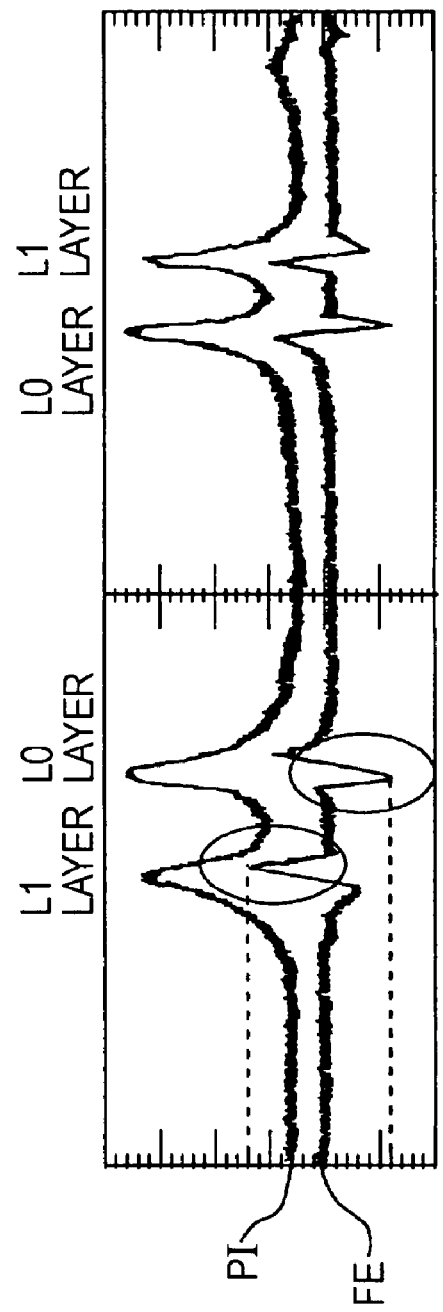
FIG. 9A
FIG. 9B

OPTICAL RECORDING MEDIUM DRIVING APPARATUS AND FOCUSING METHOD

CROSS REFERENCES TO RELATED APPLICATIONS

The present invention contains subject matter related to Japanese Patent Application JP 2006-302740 filed in the Japanese Patent Office on Nov. 8, 2006, the entire contents of which are incorporated herein by reference.

BACKGROUND OF THE INVENTION

1. Field of the Invention

The present invention relates to an optical recording medium driving apparatus that records and/or plays back a signal on an optical recording medium by using light radiation and a method of focusing light on a predetermined recording layer on the optical recording medium.

2. Description of the Related Art

Technologies for recording and playing back digital data include data recording technologies using optical disc recording media (including magneto-optical disks), such as compact discs (CDs), Minidiscs (MDs) (Registered Trademark of Sony Corporation), or digital versatile disks (DVDs). A laser beam is radiated on such an optical disc recording medium (also simply referred to as an optical disc) on which signals are recorded in pit or mark areas, and the signals are read out on the basis of the varied light beam reflected from the pit or mark areas.

Some optical disc recording media have multiple recording layers to increase the recording capacity. For example, DVDs having two recording layers are currently in widespread use.

In the case of optical disc recording media having multiple recording layers, a light beam is selectively focused on the individual recording layers to read out signals from the recording layers.

FIG. 12 illustrates how to focus light on such a multi-layer optical disc. An example of a focusing operation on the second recording layer on a two-layer optical disc is shown in FIG. 12. Of the two recording layers, the first recording layer is at the proximal side of an incident laser beam and the second recording layer is at the distal side thereof.

FIG. 12 schematically shows the focusing operation by using the waveforms of a light intensity signal (for example, a pull-in (PI) signal in the case of a four-divided detector) during focusing, a focus OK (FOK) signal, a focus error signal, and a focus drive signal and various threshold values.

In the focusing, an objective lens is driven toward the optical disc in response to the focus drive signal represented by a waveform to "ON POINT" in FIG. 12.

The light intensity signal generated when the objective lens is driven toward the optical disc is sliced with a predetermined threshold value th-FOK to generate the FOK signal, and an S-shaped curve of the focus error signal is detected during a period when the FOK signal is at a high (H) level. Specifically, an S-shaped curve of the focus error signal is detected under a condition in which the value of the focus error signal becomes lower than a threshold value th-2 after exceeding a threshold value th-1.

In the example shown in FIG. 12, since the laser light is focused on the distal second recording layer, the focusing is performed when the second S-shaped curve is detected. In other words, the focusing is performed when the value of the focus error signal becomes lower than the threshold value th-2 after exceeding the threshold value th-1 during a period when the FOK signal is at the H level again.

In recent years, high-density optical discs, such as Blu-ray discs (BDs) (Registered Trademark), have been developed, in addition to the CDs and DVDs, to further increase the recording capacity.

The BDs have disc structures including cover layers each having a thickness of about 0.1 mm. The BDs record and/or play back data under a condition in which both a laser having a wavelength of 405 nm (so-called blue laser) and an objective lens having a numerical aperture (NA) of 0.85 are used.

In the case of high-density discs, such as BDs, it is known that spherical aberration is caused due to a difference in the thickness between the cover layers above the recording layers. Particularly, since the cover layers of the different recording layers have different thicknesses on multi-layer optical discs, it is necessary to correct the spherical aberration.

When the correction of the spherical aberration is necessary, it is necessary to set a certain spherical aberration correction value in the focusing.

The spherical aberration correction value is set to a value appropriate for a target layer on which the focusing is performed in related art.

However, setting the spherical aberration correction value to a value appropriate for the target layer can prevent the S-shaped curves of the focus error signals on other recording layers from being appropriately detected. For example, when the focusing is performed on the target second recording layer, the sufficient amplitude of the focus error signal on the first recording layer can be prevented from being generated.

If the sufficient amplitude of the focus error signal on the first recording layer is not generated when the second recording layer is used as the target layer, it is not possible to appropriately focus the light on the target layer by the focusing method shown in FIG. 12. In other words, if the S-shaped curve of the focus error signal on the first recording layer is not detected, the S-shaped curve of the focus error signal on the second recording layer is erroneously recognized as the S-shaped curve of the focus error signal on the first recording layer. As a result, it is not possible to appropriately focus the light on the second recording layer.

For confirmation, when the focusing is performed on the target first recording layer, distortion of the focus error signal causes no problem. In other words, when light is focused on the first recording layer, it is sufficient to capture a light reflected from the recording layer for the first time when the objective lens is driven toward the optical disc. Accordingly, the amplitude of the focus error signal on the second recording layer is not allowed for. The focusing can be appropriately performed if only the sufficient amplitude of the focus error signal on the first recording layer is generated.

When it is necessary to correct the spherical aberration as in the case described above, the S-shaped curve of the focus error signal on the first recording layer may not be detected when the focusing is performed on the target second recording layer and the focusing may not be performed appropriately. In order to resolve these problems, for example, the focusing is currently performed by a method shown in FIG. 13.

FIG. 13 shows examples of the waveforms of a light intensity signal (PI signal), a FOK signal, a focus error signal, and a focus drive signal when the focusing is performed on the target second recording layer. In the example shown in FIG. 13, the first recording layer is represented as an "L1 layer" and the second recording layer is represented as an "L0 layer".

In the example shown in FIG. 13, the spherical aberration correction value is set to a value appropriate for the second recording layer in the focusing on the second recording layer. Accordingly, the amplitude of the focus error signal on the first recording layer (L1 layer) is made smaller than that of the focus error signal on the second recording layer (L0 layer), thus causing distortion of the focus error signal.

In contrast, the light intensity signal has a sufficient amplitude even on the L1 layer. This shows little effect of the spherical aberration on the L1 layer.

Also in the method shown in FIG. 13, first, the objective lens is driven toward the optical disc, as represented by the focus drive signal.

In this example, two threshold values thP-H and thP-L are set for the light intensity signal. The FOK signal is generated so as to be at the H level when the value of the light intensity signal exceeds the threshold value thP-H and so as to be at a low (L) level when the value thereof becomes lower than the threshold value thP-L after exceeding the threshold value thP-H.

Then, time count is started when the FOK signal becomes at the L level and it is determined whether the S-shaped curve of the focus error signal is detected within a predetermined time X since the time count is started. The detection of the S-shaped curve of the focus error signal is performed under a condition in which the value of the focus error signal exceeds a threshold value thF-H shown in FIG. 13.

If the S-shaped curve of the focus error signal is detected within the predetermined time X, the time count is performed again and it is determined again whether the S-shaped curve of the focus error signal is detected within the predetermined time X. If the S-shaped curve of the focus error signal is not detected within the predetermined time X, the objective lens is driven in the reverse direction (in the direction away from the optical disc). After the first S-shaped curve of the focus error signal is detected, the focusing is performed. The first S-shaped curve of the focus error signal is detected under a condition in which the focus error signal exceeds a threshold value thF-L after the focus error signal becomes lower than a threshold value thF-ZL during a period when the FOK signal is at the H level.

Since the optical disc has only the two recording layers, it is determined that the S-shaped curve that is finally detected is the S-shaped curve of the second recording layer if no S-shaped curve of the focus error signal is detected again within the predetermined time X since the S-shaped curve of the focus error signal is detected. In this case, driving the objective lens in the reverse direction and performing the focusing in the first S-shaped curve allow appropriate focusing on the target second recording layer.

However, in the method shown in FIG. 13, it is necessary to reciprocate the objective lens in the direction away form the optical disc when the focusing on the second recording layer is performed. Accordingly, it takes longer time to perform the focusing in the method shown in FIG. 13, compared with the typical method in the related art shown in FIG. 12, in which it is sufficient to drive the objective lens only in one direction to perform the focusing on the second recording layer.

Technologies in the related art are disclosed in, for example, Japanese Unexamined Patent Application Publication No. 2006-155792 and Japanese Unexamined Patent Application Publication No. 2003-22545.

SUMMARY OF THE INVENTION

The method shown in FIG. 13 is adopted because the sufficient amplitude of the focus error signal is not generated on the first recording layer due to setting of the spherical aberration correction value appropriate for the second recording layer in order to stabilize focus servo control on the target layer.

Accordingly, it is proposed that the focusing on the second recording layer be performed in a state in which the spherical aberration correction value is set to a value appropriate for the midpoint between the first recording layer and the second recording layer to increase the amplitude of the focus error signal on the first recording layer. In other words, the spherical aberration correction value is set to a value appropriate for the midpoint between the first recording layer and the second recording layer to prevent an occurrence of any distortion of the focus error signals on the first and second recording layers and to avoid a situation in which the S-shaped curve of the focus error signal on the first recording layer is not detected when the light is focused on the second recording layer.

However, even if the spherical aberration correction value is set to a value appropriate for the midpoint between the first and second recording layers, the amplitude characteristics of the focus error signal are not practically improved sufficiently.

FIGS. 14A to 14C show results of an experiment by the applicant.

FIG. 14A shows the waveforms of a PI signal and a focus error signal FE when the spherical aberration correction value was set to a value appropriate for the L0 layer (the second recording layer). FIG. 14B shows the waveforms of a PI signal and a focus error signal FE when the spherical aberration correction value was set to a value appropriate for the L1 layer (the first recording layer). FIG. 14C shows the waveforms of a PI signal and a focus error signal FE when the spherical aberration correction value was set to a value appropriate for the midpoint between the L0 layer and the L1 layer. Referring to FIGS. 14A to 14C, the waveforms on the left side of vertical broken lines were generated when the objective lens is driven toward the optical disc and the waveforms on the right side thereof were generated when the objective lens is driven in the direction away from the optical disc.

The waveforms in FIG. 14C generated when the spherical aberration correction value was set to a value appropriate for the midpoint show that the level of the distortion of the focus error signal FE was reduced, compared with the waveforms shown in FIGS. 14A and 14B, but was not sufficiently improved.

The distortion of the focus error signal is left even when the spherical aberration correction value is set to a value appropriate for the midpoint between the first and second recording layers because different optical discs have different optimal spherical aberration correction values due to a difference in the thickness of the cover layers between the optical discs.

Accordingly, setting the spherical aberration correction value to a value appropriate for the midpoint between the first and second recording layers causes the amplitude characteristics of the focus error signal during the focusing operation to be varied for every optical disc. As a result, it is not possible to completely avoid the situation in which the S-shaped curve of the focus error signal on the first recording layer is not detected when the light is focused on the second recording layer.

If the S-shaped curve of the focus error signal on the first recording layer is not detected, the optical disc has no choice but to adopt the method of reciprocating the objective lens, shown in FIG. 13. As a result, it is not possible to reduce the time required for the focusing on the second recording layer.

In order resolve the above-described problems, according to an embodiment of the present invention, an optical recording medium driving apparatus that records and/or plays back data on an optical recording medium having a plurality of recording layers includes head means for radiating laser light on the optical recording medium and detecting reflected light from the optical recording medium at least to read out a signal, the head means having at least a mechanism of focusing the laser light and a spherical aberration correction mechanism; focusing control means for driving the focusing mechanism on the basis of the reflected light detected by the head means to perform focusing control on each recording layer on the optical recording medium; spherical aberration correcting means for driving the spherical aberration correction mechanism on the basis of a spherical aberration correction value to correct spherical aberration; and control means for, when a condition for a focusing operation targeted for a recording layer other than a first recording layer most proximal to the side on which the laser light is incident is satisfied, controlling the focusing control means so as to set the spherical aberration correction value given by shifting the spherical aberration correction value appropriate for the midpoint between the target layer and the first recording layer by a desired value in the spherical aberration correcting means and controlling the focusing control means so as to perform the focusing control on the target layer with the spherical aberration correction value resulting from the shift being set.

According to another embodiment of the present invention, a focusing method in an optical recording medium driving apparatus that records and/or plays back data on an optical recording medium having a plurality of recording layers is provided. The optical recording medium driving apparatus includes head means for radiating laser light on the optical recording medium and detecting reflected light from the optical recording medium at least to read out a signal, the head means having at least a mechanism of focusing the laser light and a spherical aberration correction mechanism; focusing control means for driving the focusing mechanism on the basis of the reflected light detected by the head means to perform focusing control on each recording layer on the optical recording medium; and spherical aberration correcting means for driving the spherical aberration correction mechanism on the basis of a spherical aberration correction value to correct spherical aberration. The focusing method includes the steps of controlling, when a condition for a focusing operation targeted for a recording layer other than a first recording layer most proximal to the side on which the laser light is incident is satisfied, the focusing control means so as to set the spherical aberration correction value given by shifting the spherical aberration correction value appropriate for the midpoint between the target layer and the first recording layer by a desired value in the spherical aberration correcting means and controlling the focusing control means so as to perform the focusing control on the target layer with the spherical aberration correction value resulting from the shift being set.

The focusing control on the target layer is performed in the state in which the spherical aberration correction value given by shifting the spherical aberration correction value appropriate for the midpoint between the target layer and the first recording layer by a desired value is set. Accordingly, the focusing operation can be performed on the target layer in the state in which the spherical aberration correction value given by shifting the spherical aberration correction value appropriate for the midpoint between the target layer and the first recording layer on the basis of a certain correction shift value is set.

According to the present invention, the focusing operation on the target layer is performed in the state in which the spherical aberration correction value given by shifting the spherical aberration correction value appropriate for the midpoint between the target layer and the first recording layer on the basis of a certain correction shift value is set. Accordingly, for example, the focusing operation can be performed in the state in which the spherical aberration correction value accommodating the difference in the thickness of the cover layers between the recording media is set. It is possible to avoid the situation in which the S-shaped curve of the focus error signal FE on a recording layer other than the target layer is not detected even if the difference in the thickness of the cover layers between the recording media arises. Consequently, it is not necessary to adopt the method of reciprocating the objective lens in the related art, thus speeding up the focusing operation.

BRIEF DESCRIPTION OF THE DRAWINGS

FIGS. 9A and 9B are graphs showing the waveforms of pull-in signals and focus error signals in the focusing operation shown in FIG. 5 and those in the focusing operation shown in FIG. 7 to verify the effectiveness of the focusing operation shown in FIG. 7;

DESCRIPTION OF THE PREFERRED EMBODIMENTS

Preferred embodiments of the present invention will herein be described with reference to the attached drawings.

Figure 1:
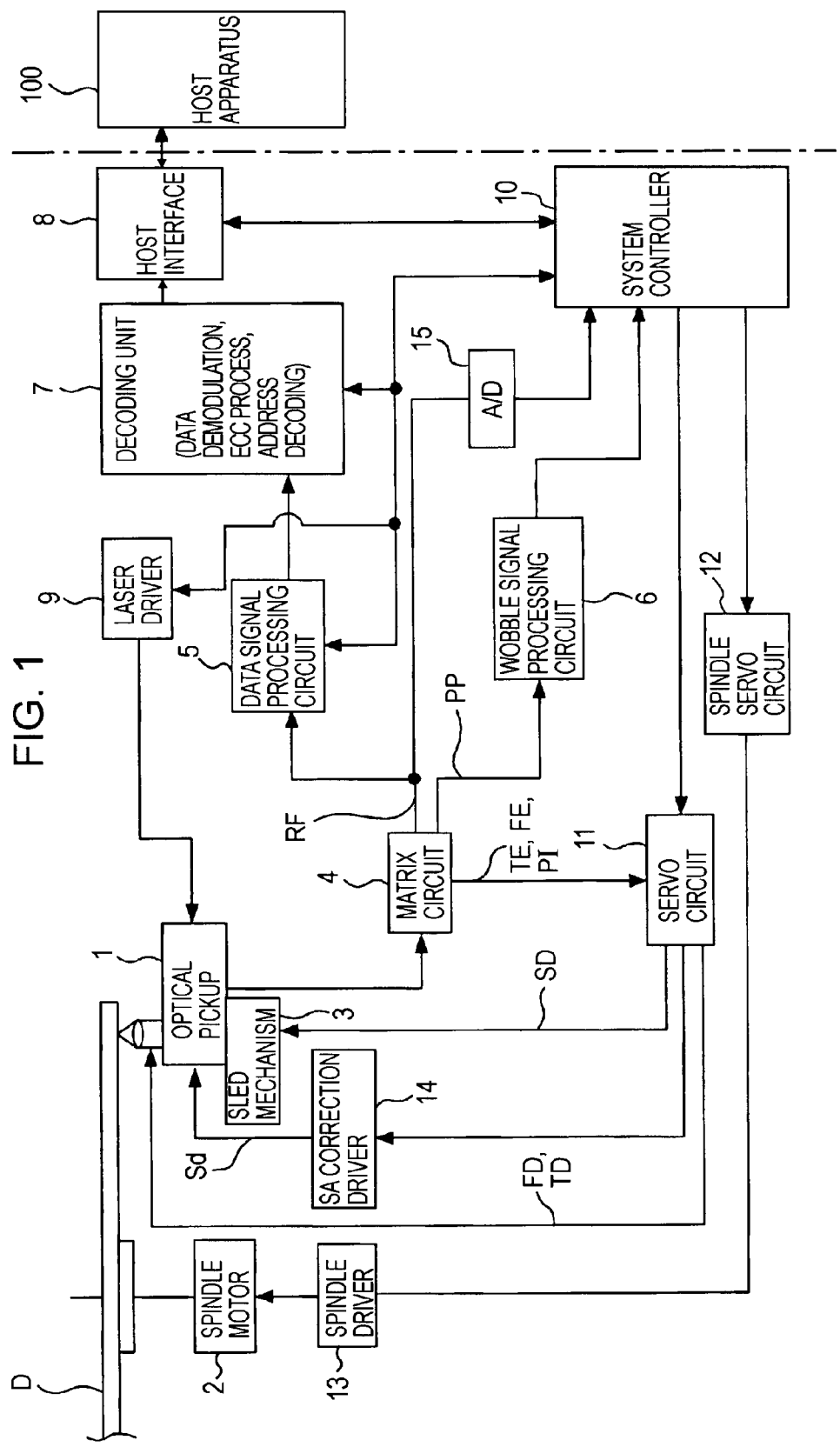
FIG. 1 is a block diagram showing an example of the internal configuration of an optical recording medium driving apparatus according to an embodiment of the present invention.

FIG. 1 is a block diagram showing an example of the internal configuration of a disk drive apparatus according to an embodiment of the present invention.

The disk drive apparatus supports a CD, a DVD, and a BD as an optical disc D shown in FIG. 1. A three-wavelength optical pickup of monocular type is adopted as an optical pickup 1 to support the optical disc D supporting the CD, the DVD, and the BD. Specifically, light beams having different three wavelengths (wavelength Δ=780 nm, 650 nm, and 405 nm) are radiated on the optical disc D through a common objective lens.

The disk drive apparatus is a playback-only apparatus capable of only data playback. The disk drive apparatus supports, as the optical disc D, not only a playback-only ROM disc on which data is recorded in pit and land areas but also a recordable disc (a write-once disc or a rewritable disc).

The disk drive apparatus according to the embodiment of the present invention also supports a multi-layer disc having multiple recording layers.

Figure 2:
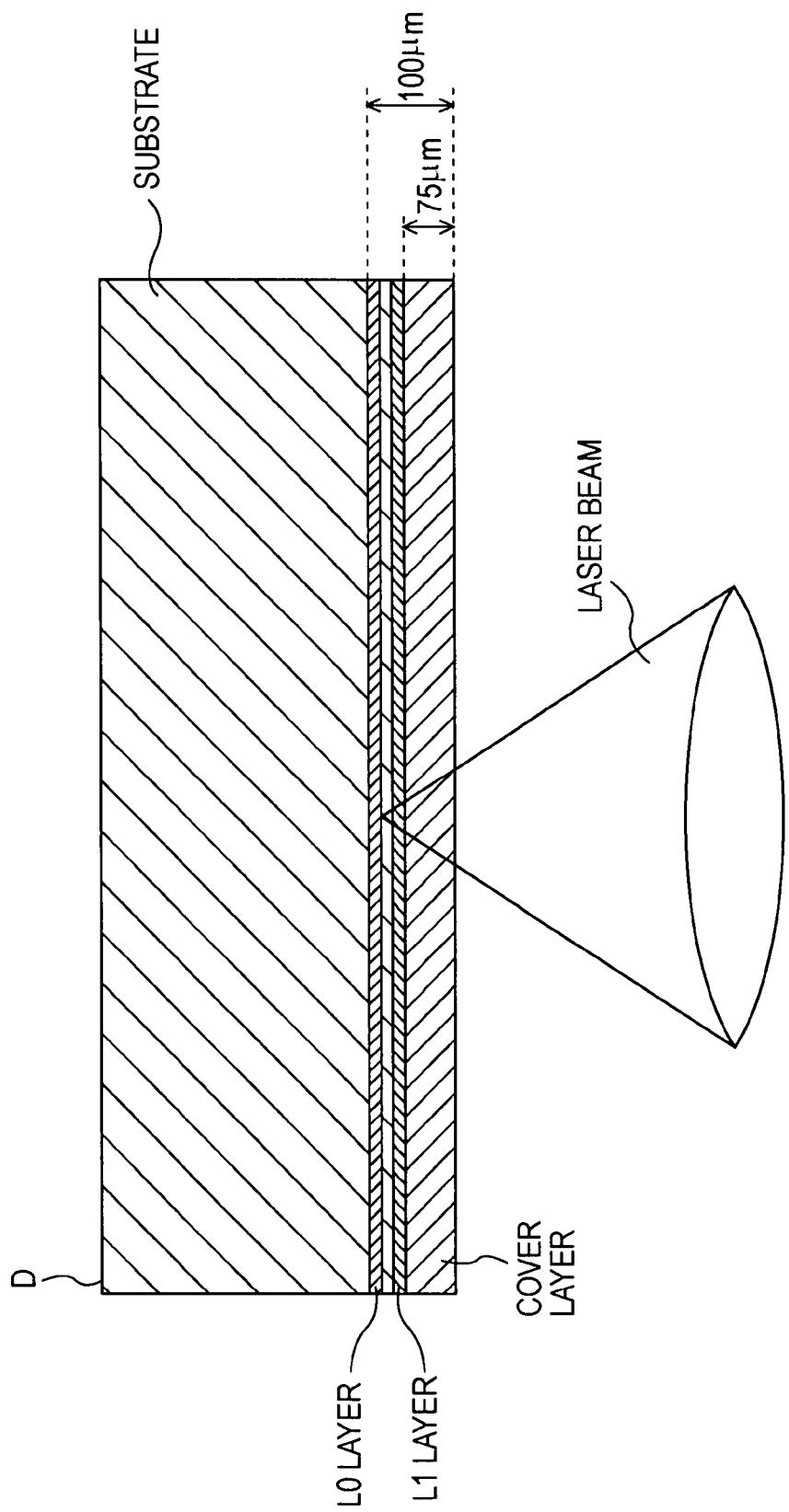
FIG. 2 is a sectional view of an optical disc, which is a two-layer BD.

For example, FIG. 2 is a sectional view of the optical disc D, which is a two-layer BD having two recording layers.

The two-layer BD shown in FIG. 2 has a cover layer, an L1 layer, an L0 layer, and a substrate formed therein in this order. The cover layer is proximal to an incident laser beam and the substrate is distal to the incident laser beam. The L1 layer (also referred to as the first recording layer), which is closer to the incident laser beam than the L0 layer, is apart from the surface of the cover layer by about 75 μm. The distal L0 layer (also referred to as the second recording layer) is apart from the surface of the cover layer by about 100 μm.

The disk drive apparatus shown in FIG. 1 selectively focuses a laser beam on the L1 layer or the L0 layer on the optical disc D to read out information recorded on each layer.

Referring back to FIG. 1, the optical disc D is mounted on a turntable (not shown) when it is loaded in the disk drive apparatus. In recording and playback operations, the optical disc D is driven and rotated by a spindle motor 2 at a certain constant linear velocity (CLV).

In the playback operation, the optical pickup 1 (optical head) reads out information recorded in the pit or mark areas on the track on the optical disc D.

Management information only for playback, for example, physical information about the optical disc D, is recorded in emboss pits or a wobbling groove on the optical disc D. Such information is read out by the optical pickup 1. In the case of the recordable optical disc D, the optical pickup 1 reads out Address In Pre-groove (ADIP) information embedded as wobbling of a groove track on the recordable optical disc D.

The optical pickup 1 includes laser diodes serving as laser sources, a photodetector for detecting reflected light, an objective lens through which a laser beam is radiated on the optical disc D, and an optical system in which the laser beam is radiated on the recording face of the optical disc D through the objective lens and the reflected light is led to the photodetector. One laser diode outputs a laser beam having a wavelength of 780 nm (CD) or of 640 nm (DVD) and the other laser diode outputs a laser beam having a wavelength of 405 nm (BD). However, since the optical pickup 1 is a three-wavelength optical pickup of monocular type as described above, the laser beams having the different wavelengths, output from the two laser diodes, are radiated on the optical disc D through the common objective lens.

In the optical pickup 1, the objective lens is held by a biaxial mechanism so as to be movable in the tracking direction and the focusing direction.

The optical pickup 1 is moved in the radial direction of the optical disc D by a sled mechanism 3.

The laser diodes in the optical pickup 1 are driven by a drive signal (drive current) supplied from a laser driver 9 to emit the laser beams.

Since the BD is supported as the optical disc D according to the embodiment of the present invention, the optical pickup 1 also has a spherical aberration correction mechanism. The spherical aberration correction mechanism is driven by a spherical aberration (SA) correction driver 14 to correct any spherical aberration.

The internal configuration of the optical pickup 1, including the spherical aberration correction mechanism, will be described in detail below.

Information on the light reflected from the optical disc D is detected by the photodetector described above. The detected information is converted into an electrical signal corresponding to the amount of received light, and the electrical signal is supplied to a matrix circuit 4.

The matrix circuit 4 includes a current-voltage converter circuit supporting output currents from multiple photoreceptors serving as the photodetector, a matrix arithmetic and amplifier circuit, and so on, and generates necessary signals by a matrix arithmetic operation.

For example, the matrix circuit 4 generates a radio-frequency (RF) signal (playback data signal) corresponding to playback data, a focus error signal FE for servo control, and a tracking error signal TE.

The matrix circuit 4 also generates a push-pull signal PP as a signal involved in the wobbling of the groove.

According to the embodiment of the present invention, the matrix circuit 4 also generates a pull-in signal PI used in a focusing operation described below.

The matrix circuit 4 supplies the playback data signal (RF signal) to a data signal processing circuit 5, supplies the focus error signal FE, the tracking error signal TE, and the pull-in signal PI to a servo circuit 11, and supplies the push-pull signal PP to a wobble signal processing circuit 6.

According to the embodiment of the present invention, the RF signal is supplied to the data signal processing circuit 5 and, in addition, information about the amplitude of the RF signal is supplied to a system controller 10 through an analog-to-digital (A/D) converter 15. The information about the amplitude of the RF signal supplied to the system controller 10 is used as an evaluation index (evaluation value) of the quality of a playback signal in automatic adjustment of a spherical aberration correction value, described below.

The data signal processing circuit 5 binarizes the playback data signal. The data signal processing circuit 5 also performs phase locked loop (PLL) processing to generate a playback clock. The data signal processing circuit 5 further detects a synchronization signal from a binary data sequence resulting from the binarization.

The data signal processing circuit 5 supplies the binary data sequence and the detected synchronization signal to a decoding unit 7. The generated playback clock, although not shown, is used as an operation clock of each component.

The decoding unit 7 demodulates the binary data sequence. Specifically, the demodulation includes demodulation of the playback data, deinterleaving, error correcting code (ECC) decoding, and address decoding.

In the playback, the decoding unit 7 demodulates the binary data sequence at a time determined on the basis of the binary data sequence binarized by the data signal processing circuit 5 and the synchronization signal to generate playback data. The playback data decoded by the decoding unit 7 is supplied to a host interface 8 and is transferred to a host apparatus 100 on the basis of an instruction from the system controller 10. The host apparatus 100 is, for example, a computer apparatus or an audio-visual (AV) system.

The decoded address data is supplied to the system controller 10.

When the optical disc D is a recordable disc, the management information, such as the physical information about the optical disc D, and the ADIP information are recorded in the wobbling groove on the optical disc D.

The wobble signal processing circuit 6 detects information recorded in the wobbling groove on the optical disc D from the push-pull signal PP supplied from the matrix circuit 4 on the basis of an instruction from the system controller 10 and supplies the detected information to the system controller 10.

The servo circuit 11 generates focus, tracking, and sled servo drive signals from the focus error signal FE and the tracking error signal TE supplied from the matrix circuit 4 to perform servo control.

Specifically, the servo circuit 11 generates a focus drive signal FD and a tracking drive signal TD in accordance with the focus error signal FE and the tracking error signal TE to drive the focusing coil and the tracking coil in the biaxial mechanism in the optical pickup 1. The optical pickup 1, the matrix circuit 4, the servo circuit 11, and the biaxial mechanism form a tracking servo loop and a focus servo loop.

The servo circuit 11 turns off the tracking servo loop in response to a track jump instruction supplied from the system controller 10 and outputs a jump drive signal to perform track jumping.

In addition, the servo circuit 11 generates a sled drive signal SD on the basis of a sled error signal generated as a reduced component of the tracking error signal TE and access control from the system controller 10 to drive the sled mechanism 3 by using the sled drive signal SD. The sled mechanism 3 includes a main shaft holding the optical pickup 1, a sled motor, and a transmission gear (not shown). The sled mechanism 3 drives the sled motor in response to the sled drive signal SD to slide the optical pickup 1 by a desired distance.

Furthermore, the servo circuit 11 performs focusing control for focusing light on the recording layers on the optical disc D on the basis of the focus error signal FE and the pull-in signal PI supplied from the matrix circuit 4.

In the case of the optical disc D having multiple recording layers, the servo circuit 11 performs focus jump control on the basis of the focus error signal FE.

The servo circuit 11 is capable of setting the spherical aberration correction value for the SA correction driver 14. Specifically, the servo circuit 11 is capable of setting the spherical aberration correction value based on an instruction from the system controller 10 in the SA correction driver 14. The SA correction driver 14 drives the spherical aberration correction mechanism in the optical pickup 1 in response to a drive signal Sd corresponding to the set spherical aberration correction value.

The servo circuit 11 is also capable of setting a focus bias. Specifically, the servo circuit 11 is capable of adding the focus bias based on an instruction from the system controller 10 to the focus servo loop described above.

A spindle servo circuit 12 controls CLV rotation of the spindle motor 2.

The spindle servo circuit 12 acquires the playback clock generated by the data signal processing circuit 5 as information about the current rotation speed of the spindle motor 2 and compares the generated rotation speed information with predetermined CLV reference speed information to generate a spindle error signal.

When the optical disc D is a recordable disc, the spindle servo circuit 12 can acquire the clock generated in the PLL processing for a wobble signal as the information about the current rotation speed of the spindle motor 2. In this case, the spindle servo circuit 12 may compare the rotation speed information with the predetermined CL reference speed information to generate the spindle error signal.

The spindle servo circuit 12 outputs a spindle drive signal generated in accordance with the spindle error signal to cause the spindle driver 13 to perform the CLV rotation of the spindle motor 2.

The spindle servo circuit 12 generates the spindle drive signal in response to a spindle kick-brake control signal supplied from the system controller 10 to activate or stop the spindle motor 2 or to increase or decrease the speed of the spindle motor 2.

Each operation by the servo system and playback system is controlled by the system controller 10 composed of a micro computer.

The system controller 10 performs a variety of processing in response to commands transmitted from the host apparatus 100 through the host interface 8.

For example, if a "read" command requesting transfer of certain data recorded on the optical disc D is transmitted from the host apparatus 100, the system controller 10 performs seek operation control for specified addresses. Specifically, the system controller 10 instructs the servo circuit 11 to cause the optical pickup 1 to access the addresses specified with a "seek" command.

Then, the system controller 10 performs operation control necessary to transfer the data during the specified data period to the host apparatus 100. Specifically, the system controller 10 causes the data signal processing circuit 5 and the decoding unit 7 to play back a signal (playback data signal) read out from the optical disc D and transfers the requested data to the host apparatus 100.

In this case, the system controller 10 performs the automatic adjustment of the spherical aberration correction value, which will be described in detail below.

The system controller 10 also performs processing for realizing the focusing operation described below according to the embodiment of the present invention.

Although the disk drive apparatus connected to the host apparatus 100 is described as the optical recording medium driving apparatus in the example shown in FIG. 1, the optical recording medium driving apparatus according to the embodiment of the present invention may not be connected to another apparatus. In this case, the optical recording medium driving apparatus may include an operation unit and a display unit or the configuration of the data input-output interface unit may be different from the one shown in FIG. 1. In other words, the optical recording medium driving apparatus may have another configuration as long as the optical recording medium driving apparatus records and/or plays back data in response to an user's operation and has terminals through which a variety of data is input and output.

The optical recording medium driving apparatus may have various other configurations. For example, the optical recording medium driving apparatus may have a configuration capable of recording data. In other words, the disk drive apparatus according to the embodiment of the present invention may be a recording-playback apparatus or a recording-only apparatus.

Figure 3:
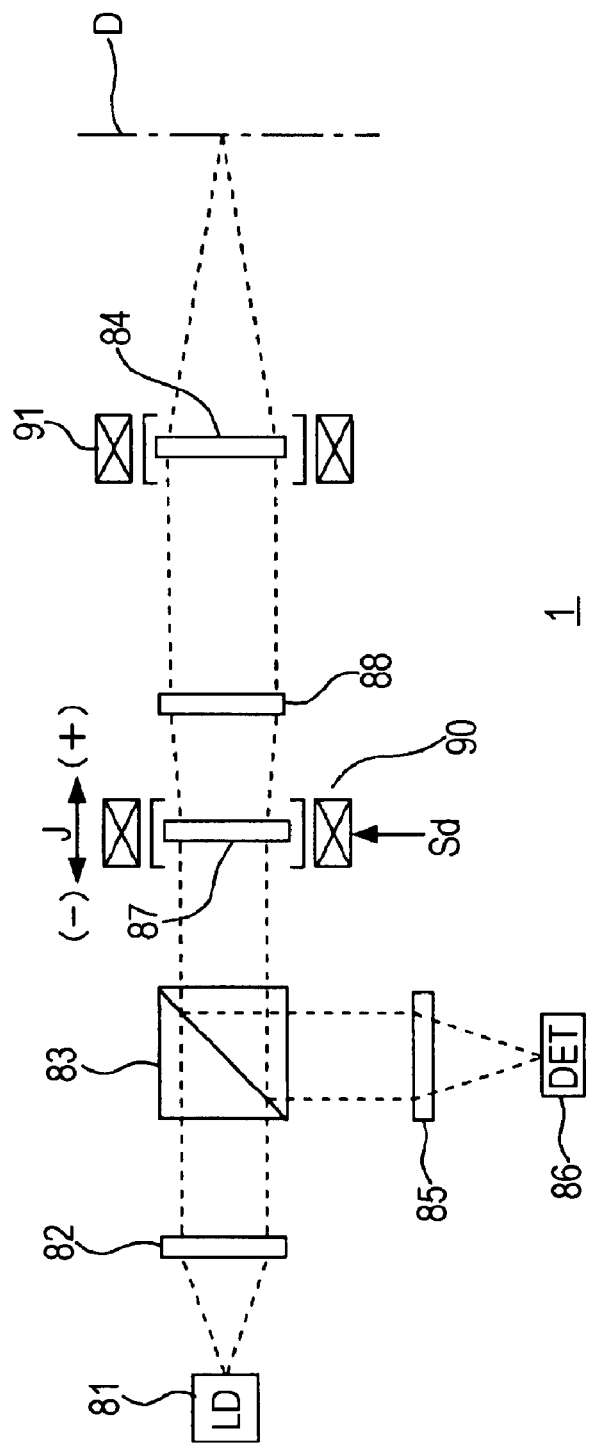
FIG. 3 shows an example of the configuration of a spherical aberration correction mechanism of an optical pickup according to the embodiment of the present invention.

FIG. 3 shows an example of the configuration of the spherical aberration correction mechanism of the optical pickup 1 shown in FIG. 1. The configuration of the optical system in the optical pickup 1 is mainly shown in FIG. 3.

Referring to FIG. 3, a laser light beam emitted from a semiconductor laser (laser diode) 81 is incident on a collimator lens 82 where a collimated light beam is generated. The collimated light beam passes through a beam splitter 83 and a group of spherical aberration correction lenses including a movable lens 87 and a fixed lens 88, and is radiated on the optical disc D through an objective lens 84. The group of spherical aberration correction lenses including the movable lens 87 and the fixed lens 88 is called an expander. Since the spherical aberration correction is performed by driving the movable lens 87, the movable lens 87 is also referred to as the spherical aberration correction lens 87.

A light beam reflected from the optical disc D passes through the objective lens 84, the fixed lens 88, and the movable lens 87 and is reflected by the beam splitter 83. The light beam reflected by the beam splitter 83 is incident on a detector 86 through a collimator lens (condenser lens) 85.

In such an optical system, the objective lens 84 is held by a biaxial mechanism 91 so as to be movable in the focusing direction and the tracking direction to perform focus servo and tracking servo operations.

The spherical aberration correction lens 87 has a function of defocusing the wavefront of a laser light beam. Specifically, the spherical aberration correction lens 87 is movable in J direction, which is the direction of the optical axis, by an actuator 90 to which the drive signal Sd is supplied. The object point of the objective lens 84 is adjusted on the basis of the movement of the spherical aberration correction lens 87.

In other words, the drive signal Sd is supplied to the actuator 90 to control the actuator 90 so as to move the spherical aberration correction lens 87 in the direction of the optical axis, whereby performing the spherical aberration correction.

Although the spherical aberration correction mechanism in FIG. 3 has the configuration in which the so-called expander is used to perform the spherical aberration correction, the spherical aberration correction mechanism may have a configuration in which a liquid crystal panel is used to perform the spherical aberration correction.

Specifically, in the liquid crystal panel provided in the optical path from the semiconductor laser 81 to the objective lens 84, the boundary between an area where the laser light beam is transmitted and an area where the laser light beam is shielded is variably adjusted to vary the diameter of the laser light beam, whereby performing the spherical aberration correction.

In this case, a liquid crystal driver configured to drive the liquid crystal panel is controlled so as to vary the transmission area.

The spherical aberration correction mechanism may have a configuration in which the movable lens 87 and the fixed lens 88 are omitted and the collimator lens 82 is driven in the J direction, in addition to the configuration in which the movable lens 87 and the fixed lens 88 are provided and the movable lens 87 is driven as in the example shown in FIG. 3. In such a case, the actuator 90 is provided for the collimator lens 82 and the drive signal Sd is supplied to the actuator 90 for the collimator lens 82 to control the movement of the collimator lens 82 in the J direction.

Figure 4:
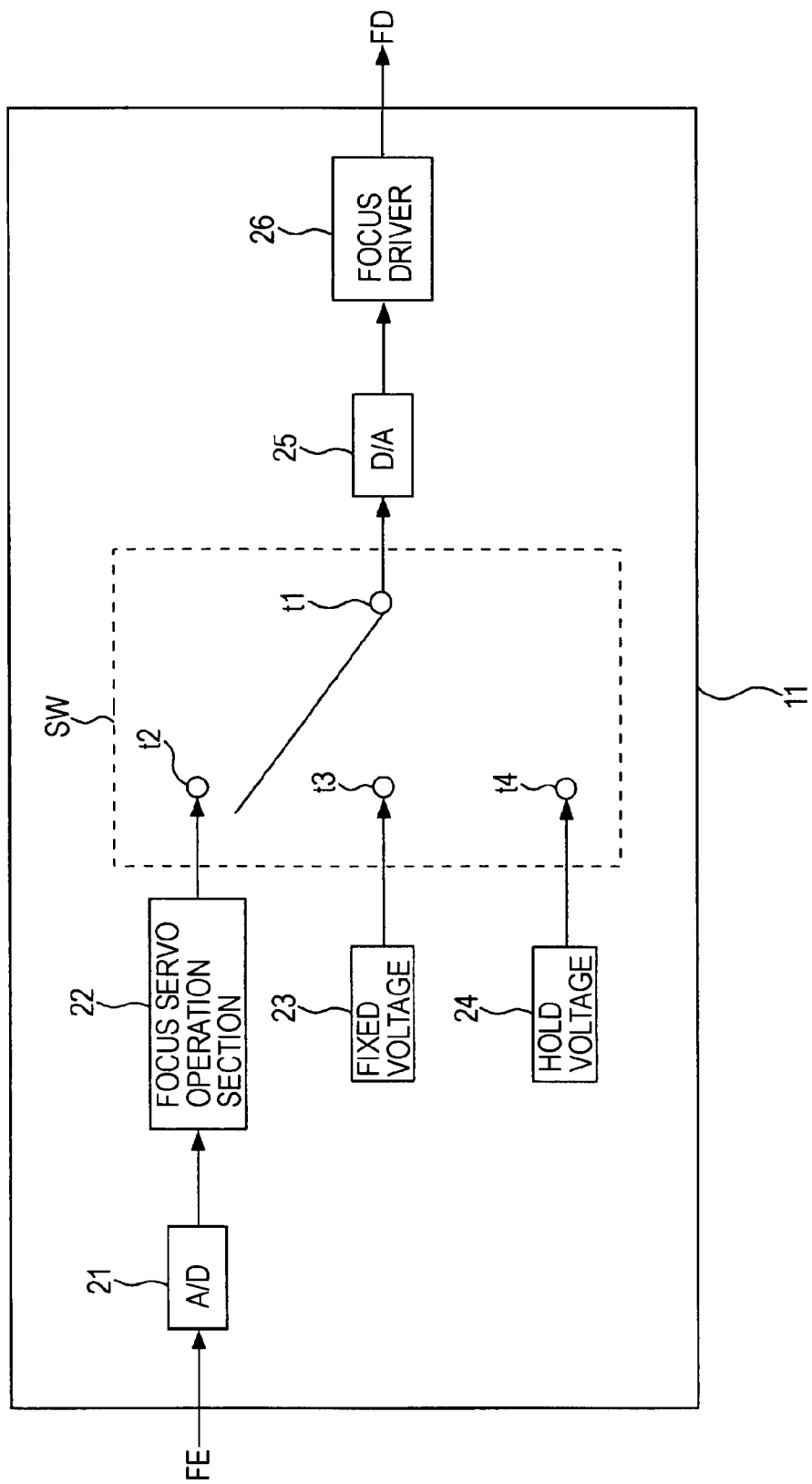
FIG. 4 is a block diagram showing an example of the internal configuration of a servo circuit in the optical recording medium driving apparatus according to the embodiment of the present invention, mainly showing a focus control system in the servo circuit.

FIG. 4 is a block diagram showing an example of the internal configuration of the servo circuit 11 shown in FIG. 1. Only the focus control system in the servo circuit 11 is shown in FIG. 4.

Referring to FIG. 4, the focus error signal FE supplied from the matrix circuit 4 shown in FIG. 1 is converted into digital data by an analog-to-digital (A/D) converter 21 in the servo circuit 11 and the digital data is supplied to a focus servo operation section 22.

The focus servo operation section 22 performs predetermined processing, such as filtering and loop gain control for phase compensation, to the focus error signal FE input as the digital data to generate a focus servo signal.

The focus servo signal is supplied to a terminal t2 in a switch SW in FIG. 4.

The switch SW is configured such that a terminal t1 is selectively connected to the terminal t2, a terminal t3, or a terminal t4. A fixed voltage 23 is applied to the terminal t3 and a hold voltage 24 is applied to the terminal t4.

The terminal t1 is connected to a digital-to-analog (D/A) converter 25, and an output from the D/A converter 25 is output as the focus drive signal FD through a focus driver 26.

The servo circuit 11 performs switching between the terminals in the switch SW to perform the focusing control and the focus jump control.

In the focusing control, first, the terminal t3 is selected in the switch SW to apply the fixed voltage 23 and the objective lens 84 is driven in the direction toward the optical disc D by the biaxial mechanism 91. Then, it is determined whether a condition of the pull-in signal PI or the focus error signal FE is satisfied on the basis of predetermined threshold values. If the focusing condition is satisfied, the terminal t3 is switched to the terminal t2 to perform the focus servo control. The focusing control on the target layer is performed in the above manner.

In the focus jump control, first, the terminal t3 is selected in the switch SW to apply the fixed voltage 23 as a kick voltage. Then, the terminal t3 is switched to the terminal t4 to apply the hold voltage 24 in order to move the objective lens 84 toward the recording layer to which the focus is to be jumped. A value corresponding to the position where objective lens 84 is held is calculated because the position of the recording layer is varied between the CD, the DVD, and the BD, and the hold voltage 24 corresponding to the calculated value is output.

It is determined whether a condition of the focus error signal FE is satisfied on the basis of predetermined threshold values after starting the application of the kick voltage. If the focusing condition is satisfied, the terminal t3 is selected in the switch SW to apply the fixed voltage 23 as a braking voltage and, then, the terminal t3 is switched to the terminal t2 to perform the focus servo control on the recording layer to which the focus is jumped. The focus jump control is performed in the above manner.

The focus jump operation according to the embodiment of the present invention will be described in detail below.

The disk drive apparatus according to the embodiment of the present invention supports the BD as the optical disc D.

As described above, since the spherical aberration is caused on the BD due to a difference in the thickness between the cover layers along with the increasing numerical aperture (NA), it is necessary to correct the spherical aberration. The disk drive apparatus according to the embodiment of the present invention is provided with the spherical aberration correction mechanism (the fixed lens 88, the movable lens 87, and the actuator 90) and the SA correction driver 14 shown in FIG. 3 to correct the spherical aberration.

Specifically, in the spherical aberration correction, spherical aberration correction values are set for the SA correction driver 14. Initial values of the spherical aberration correction values, which are used as reference values on the respective recording layers, are set in advance in the disk drive apparatus. Specifically, a spherical aberration correction value SA_L1 optimal for the L1 layer (the first recording layer with the cover layer having a thickness of 75 μm) and a spherical aberration correction value SA_L0 optimal for the L0 layer (the second recording layer with the cover layer having a thickness of 100 μm) are set as the initial values of the spherical aberration correction values on the respective recording layers.

Ideally, setting the initial values for the respective recording layers to perform the spherical aberration correction allows the spherical aberration to be appropriately corrected. However, since the cover layers of different optical discs practically have different thicknesses, the spherical aberration correction values are automatically adjusted for every optical disc.

In the automatic adjustment of the spherical aberration correction values, when a condition for the focusing operation on a predetermined recording layer is satisfied for the first time, the spherical aberration correction value set in advance for the predetermined recording layer is varied with respect to the initial value of the spherical aberration correction value used as the reference value to acquire evaluation values. A shift value corresponding to the difference between the initial value and the optimal evaluation value, among the acquired evaluation values, is determined as a correction shift value b.

For example, when the focus servo control is enabled once in the first focusing operation on the L0 layer (the second recording layer), signals are read out by the optical pickup 1 while varying the spherical aberration correction value with respect to the initial value used as the reference value and the amplitudes of the RF signals are acquired as the evaluation values. A shift value corresponding to the difference between the initial value and the optimal evaluation value (the highest amplitude) is determined as the correction shift value b.

Specifically, when the focusing servo control is enabled on the L0 layer, the system controller 10 reads out the initial value for the L0 layer from, for example, the internal ROM and instructs the servo circuit 11 to sequentially set the spherical aberration correction values varied with respect to the initial value in the SA correction driver 14. The system controller 10 acquires the amplitudes of the RF signals generated in the matrix circuit 4 with the respective spherical aberration correction values being set through the A/D converter 15. The system controller 10 determines the shift value corresponding to the difference between the initial value and the maximum amplitude to be the correction shift value b.

In the subsequent readout of signals on each recording layer, the spherical aberration correction value given by adding (or subtracting) the correction shift value b to (or from) the initial value on the recording layer is used.

Performing the automatic adjustment of each spherical aberration correction value described above allows the spherical aberration correction value to be set to the optimal value determined on the basis of the measured amplitude of the RF signal (the evaluation value of the quality of the playback signal). Accordingly, it is possible to read out the signals in a state in which the spherical aberration is optimally corrected even if the cover layers of different optical discs have different thicknesses.

Although the correction shift value b is determined from the spherical aberration correction value providing the optimal evaluation value, the embodiment of the present invention is not limited to this determination. The correction shift value b can be determined from the spherical aberration correction value providing a predetermined evaluation value to correct the difference in the thickness of the cover layers between the optical discs.

The disk drive apparatus according to the embodiment of the present invention, supporting the BD as the optical disc D, performs the spherical aberration correction in the above manner. In the spherical aberration correction, as described above, the spherical aberration correction value is adjusted to an appropriate value so as to stabilize the focus servo control in the focusing operation.

In the focusing operation in the related art, the spherical aberration correction value appropriate for the target layer of the focusing operation is set. For example, in order to focus light on the L0 layer, the focusing operation is performed with the initial value for the L0 layer being set.

Figure 12:
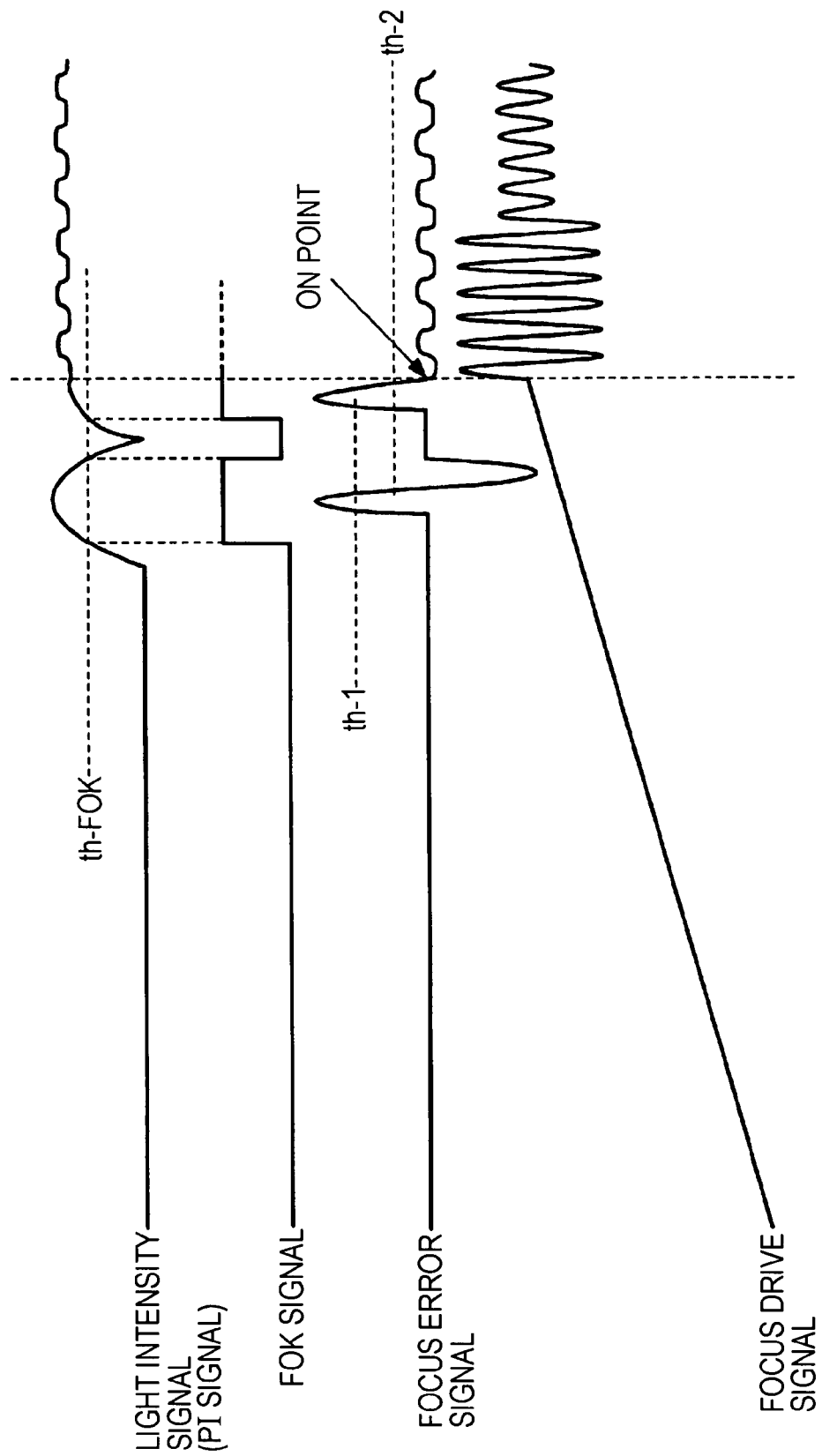
FIG. 12 illustrates a focusing operation in the related art.

However, when the spherical aberration correction value is set to a value appropriate for the target layer, the S-shaped curves of the focus error signals on other recording layers may not be appropriately detected. For example, when the focusing operation is performed on the target second recording layer, the sufficient amplitude of the focus error signal on the first recording layer may not be generated. With the focusing method shown in FIG. 12 in which the objective lens is driven only in one direction, it is not possible to detect the S-shaped curve of the focus error signal on the first recording layer and, therefore, it is not possible to appropriately focus light on the second recording layer.

When the spherical aberration correction value is set to a value appropriate for the target layer, the S-shaped curve of the focus error signal may not be appropriately detected on recording layers more proximal to the light source than the target layer. Accordingly, the method of reciprocating the objective lens in the direction away form the optical disc is currently adopted (refer to FIG. 13).

Figure 13:
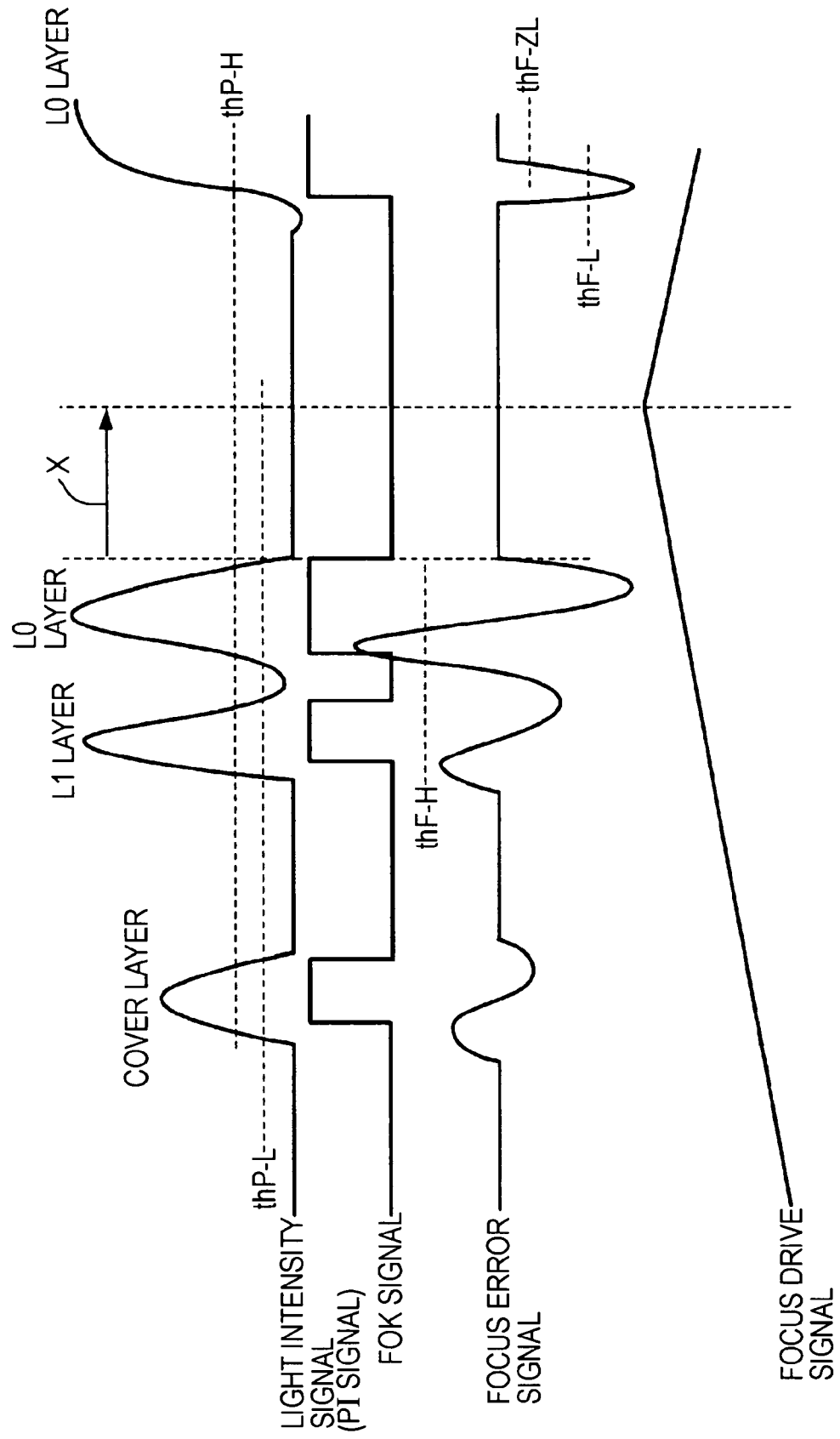
FIG. 13 illustrates another focusing operation in the related art performed when distortion occurs in the focus error signal.

However, the method shown in FIG. 13 has the problem in that it takes longer time to reciprocate the objective lens.

In order to resolve such a problem, methods of preventing distortion of the amplitudes of the focus error signals on the first and second recording layers are adopted. For example, the spherical aberration correction value is set to a value appropriate for the midpoint between the first and second recording layers to generate equal amplitudes of the focus error signals on the respective recording layers. Specifically, the spherical aberration correction value is set to a value calculated by "SA_L1+SA_L0/2" where SA_L1 denotes the initial value set for the first recording layer (L1 layer) and SA_L0 denotes the initial value set for the second recording layer (L0 layer).

Figure 14A:
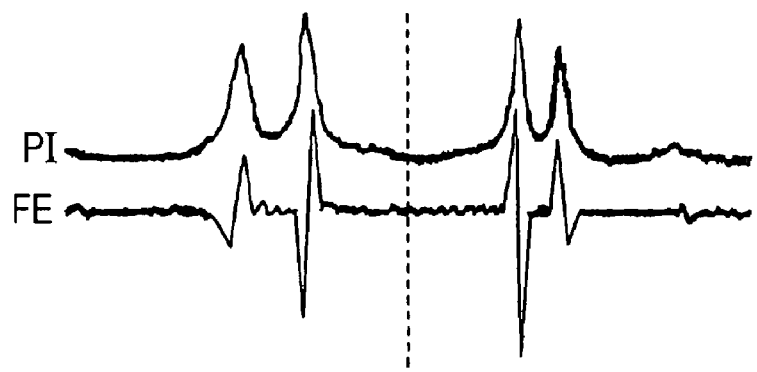
FIG. 14A shows the waveforms of a pull-in signal and a focus error signal when a spherical aberration correction value was set to a value appropriate for an L0 layer (the second recording layer)
Figure 14B:
FIG. 14B shows the waveforms thereof when the spherical aberration correction value was set to a value appropriate for an L1 layer (the first recording layer)
Figure 14C:
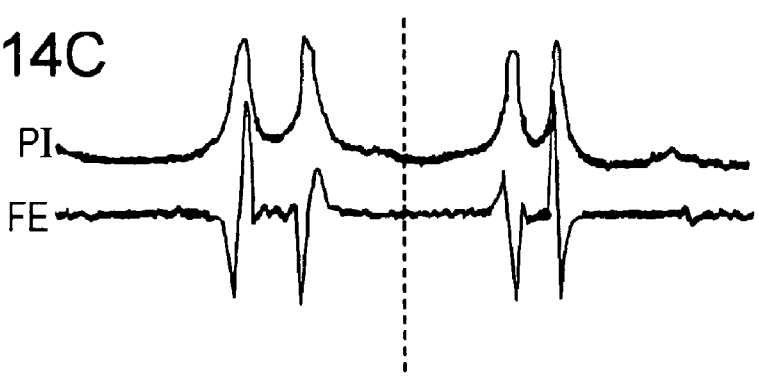
FIG. 14C shows the waveforms thereof when the spherical aberration correction value was set to a value appropriate for the midpoint between the L0 layer and the L1 layer.

However, the amplitude characteristics of the focus error signal is not practically improved sufficiently even if the spherical aberration correction value is set to a value appropriate for the midpoint between the first and second recording layers. For example, even when the spherical aberration correction value was set to a value appropriate for the midpoint between the first and second recording layers as in the example shown in FIG. 14C, the level of the distortion of the focus error signal is reduced, compared with the waveforms generated when the spherical aberration correction values were set to values appropriate for the L0 and L1 recording layers, shown in FIGS. 14A and 14B, but is not sufficiently improved.

The distortion is left in the focus error signals on the L0 layer and the L1 layer even when the spherical aberration correction value is set to a value appropriate for the midpoint between the first and second recording layers because the different optical discs have different optimal spherical aberration correction values due to the difference in the thickness of the cover layers between the optical discs.

Accordingly, it is not possible to completely avoid the situation in which the S-shaped curve of the focus error signal on the first recording layer is not detected when the light is focused on the second recording layer by setting the spherical aberration correction value to a value appropriate for the midpoint between the first and second recording layers. When the S-shaped curve of the focus error signal on the first recording layer is not detected, the optical disc has no choice but to adopt the method of reciprocating the objective lens, shown in FIG. 13. As a result, it is not possible to reduce the time required for the focusing on the second recording layer.

In order to resolve the above problems, according to an embodiment of the present invention, the focusing operation on the target second recording layer (L0 layer) is performed in the state in which the spherical aberration correction value given by shifting the spherical aberration correction value appropriate for the midpoint between the L0 layer and the L1 layer by a desired value is set.

Specifically, a value given by shifting the spherical aberration correction value (SA_L1+SA_L0/2) appropriate for the midpoint by the correction shift value b calculated by the automatic adjustment of the spherical aberration correction value is set as the spherical aberration correction value in the focusing operation on the L0 layer.

Figure 5:
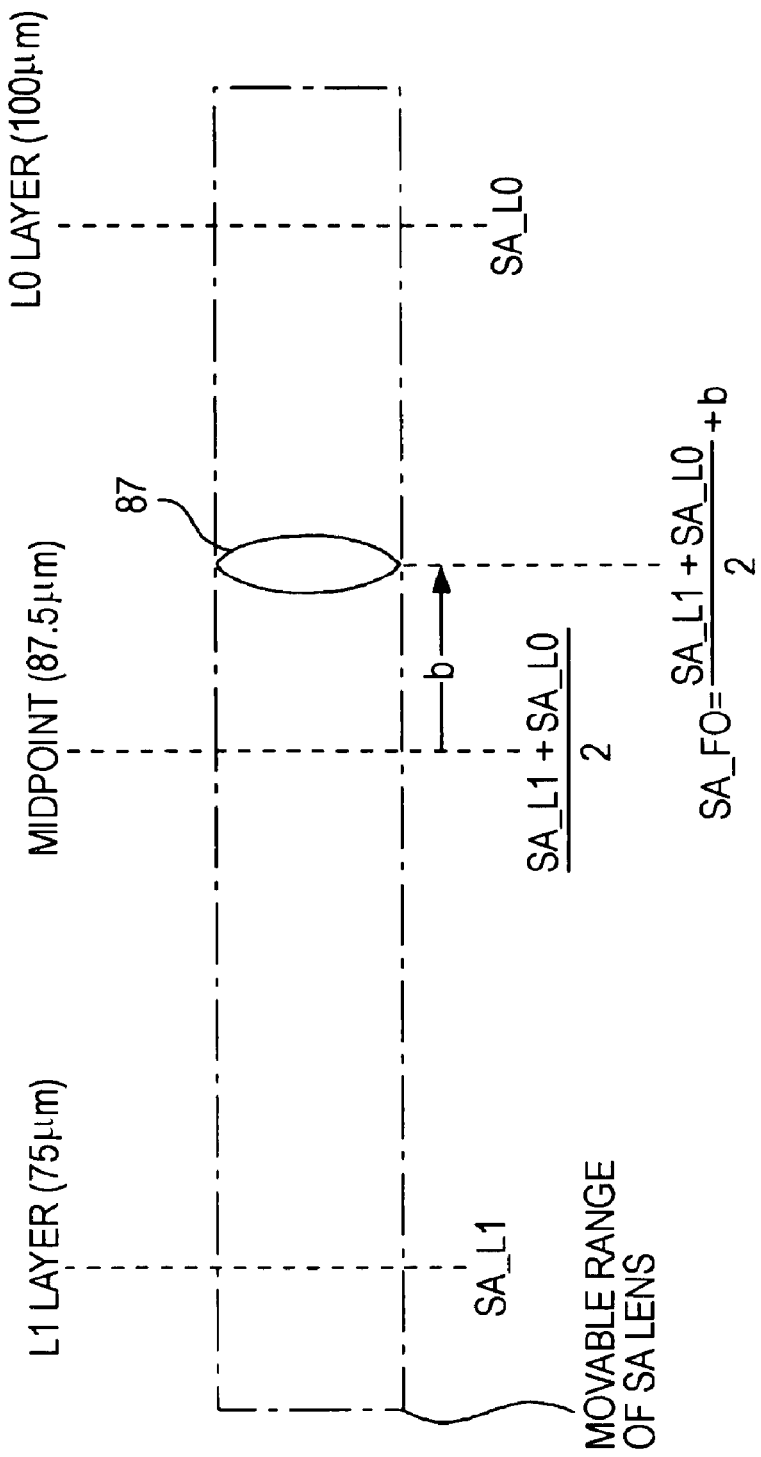
FIG. 5 illustrates how to perform a focusing operation according to an embodiment of the present invention.

FIG. 5 illustrates how to perform the focusing operation according to the embodiment of the present invention. FIG. 5 schematically shows the relationship between the movable range of the spherical aberration correction lens 87 shown in FIG. 3 (a movable range of SA lens indicated by a dotted-chain line in FIG. 5) and the spherical aberration correction value for the L1 layer (the initial value SA_L1), the spherical aberration correction value for the L0 layer (the initial value SA_L0), and the spherical aberration correction value for the midpoint between the L1 and L0 layers (SA_L1+SA_L0/2).

According to the embodiment of the present invention, the spherical aberration correction value is set to a value given by adding the correction shift value b calculated by the automatic adjustment of the spherical aberration correction value to the spherical aberration correction value for the midpoint (SA_L1+SA_L0/2). Specifically, a spherical aberration correction value SA_F0=SA_L1+SA_L1/2+b is set as the spherical aberration correction value to be set in the focusing operation for the target L0 layer.

The focusing operation is performed on the target L0 layer with the spherical aberration correction value SA_F0 being set.

Figure 6:
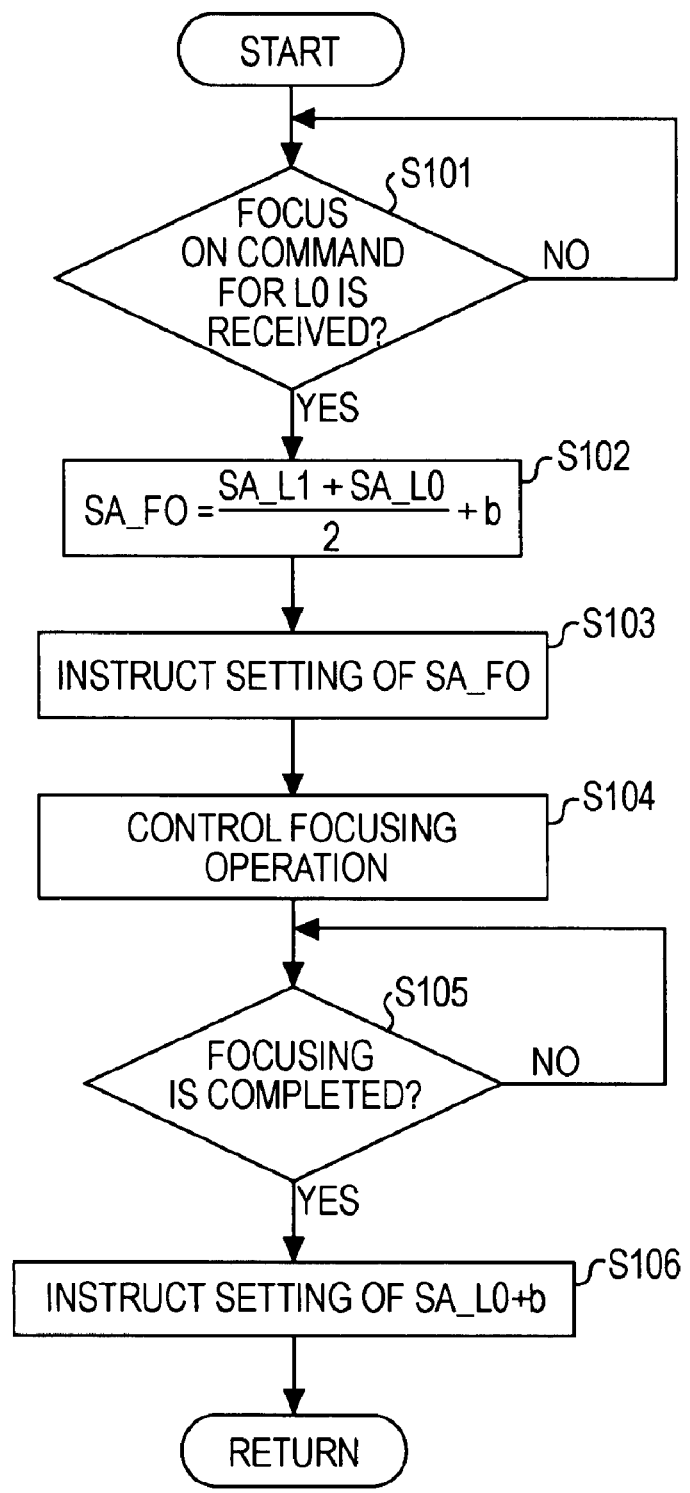
FIG. 6 is a flowchart showing an example of a process for realizing the focusing operation shown in FIG. 5.

FIG. 6 is a flowchart showing an example of a process for realizing the focusing operation according to the embodiment of the present invention. The process shown in FIG. 6 is performed by the system controller 10 shown in FIG. 1 in accordance with programs stored in, for example, the ROM in the system controller 10.

It is presumed that the correction shift value b is calculated in advance by the automatic adjustment of the spherical aberration correction value before starting the process shown in FIG. 6.

Referring to FIG. 6, in Step S101, the system controller 10 waits for a focus ON command for the L0 layer. Specifically, since the host apparatus 100 issues an instruction using the focus ON command in the focusing operation, the system controller 10 waits for a command for the L0 layer as the focus ON command in Step S101.

If the system controller 10 receives the focus ON command for the L0 layer, in Step S102, the system controller 10 calculates SA_F0=SA_L1+SA_L0/2+b. Specifically, the system controller 10 calculates the SA_F0 by using the initial values SA_L1 and SA_L0 set in advance for the L1 and L0 layers and the correction shift value b calculated in the automatic adjustment.

In Step S103, the system controller 10 instructs the servo circuit 11 to set the calculated spherical aberration correction value SA_F0 in the SA correction driver 14. The setting causes the spherical aberration correction lens 87 to move to a position corresponding to the spherical aberration correction value SA_F0.

In Step S104, the system controller 10 controls the focusing operation. Specifically, the system controller 10 instructs the servo circuit 11 to perform the focusing operation for the target L0 layer.

In Step S105, the system controller 10 waits for an indication of completion of the focusing operation from the servo circuit 11. If the system controller 10 receives the indication of completion of the focusing operation, in Step S106, the system controller 10 instructs the servo circuit 11 to set a spherical aberration correction value SA_L0+b.

Since the system controller 10 instructs the servo circuit 11 to set the spherical aberration correction value SA_L0+b in Step S106, it is possible to set the spherical aberration correction value optimal for the L0 layer after the focusing operation on the L0 layer is completed. Accordingly, signals are read out from the L0 layer with the optimal spherical aberration correction value being set.

As described above, according to the embodiment of the present invention, the focusing operation on the L0 layer is performed in the state in which the spherical aberration correction value is set to a value given by shifting the spherical aberration correction value appropriate for the midpoint by the correction shift value b set for accommodating the difference in the thickness of the cover layers between the optical discs. Accordingly, it is possible to avoid the situation in which the S-shaped curve of the focus error signal FE on the L1 layer is not detected even if the difference in the thickness of the cover layers between the optical discs arises. Consequently, it is not necessary to adopt the method of reciprocating the objective lens in the related art, as shown in FIG. 13, thus speeding up the focusing operation.

Since the spherical aberration correction value is set to a value based on the midpoint between the L1 layer and the L0 layer in the focusing operation according to the embodiment of the present invention, the amplitude of the focus error signal FE on each recording layer tends to even slightly decrease, compared with the case where the spherical aberration correction value is set to a value appropriate for each recording layer.

When a multiple-wavelength optical pickup of monocular type is adopted as the optical pickup 1 to radiate laser light beams with multiple wavelengths, such as three wavelengths, on the optical disc D through the common objective lens 84 as in the embodiment of the present invention, the amplitude of the focus error signal FE tends to decrease due to this configuration.

Even a slight decrease in the amplitude of the focus error signal FE seems to work against the stabilization of the focusing operation.

With the method shown in FIG. 5 in which the spherical aberration correction value appropriate for the midpoint is shifted by the correction shift value b, the focusing operation on the L0 layer can be stably performed. However, in order to further stabilize the focusing operation in view of the decrease in the amplitude of the focus error signal when the multiple-wavelength optical pickup of monocular type is adopted as the optical pickup, a focusing operation shown in FIG. 7 may be performed.

Figure 7:
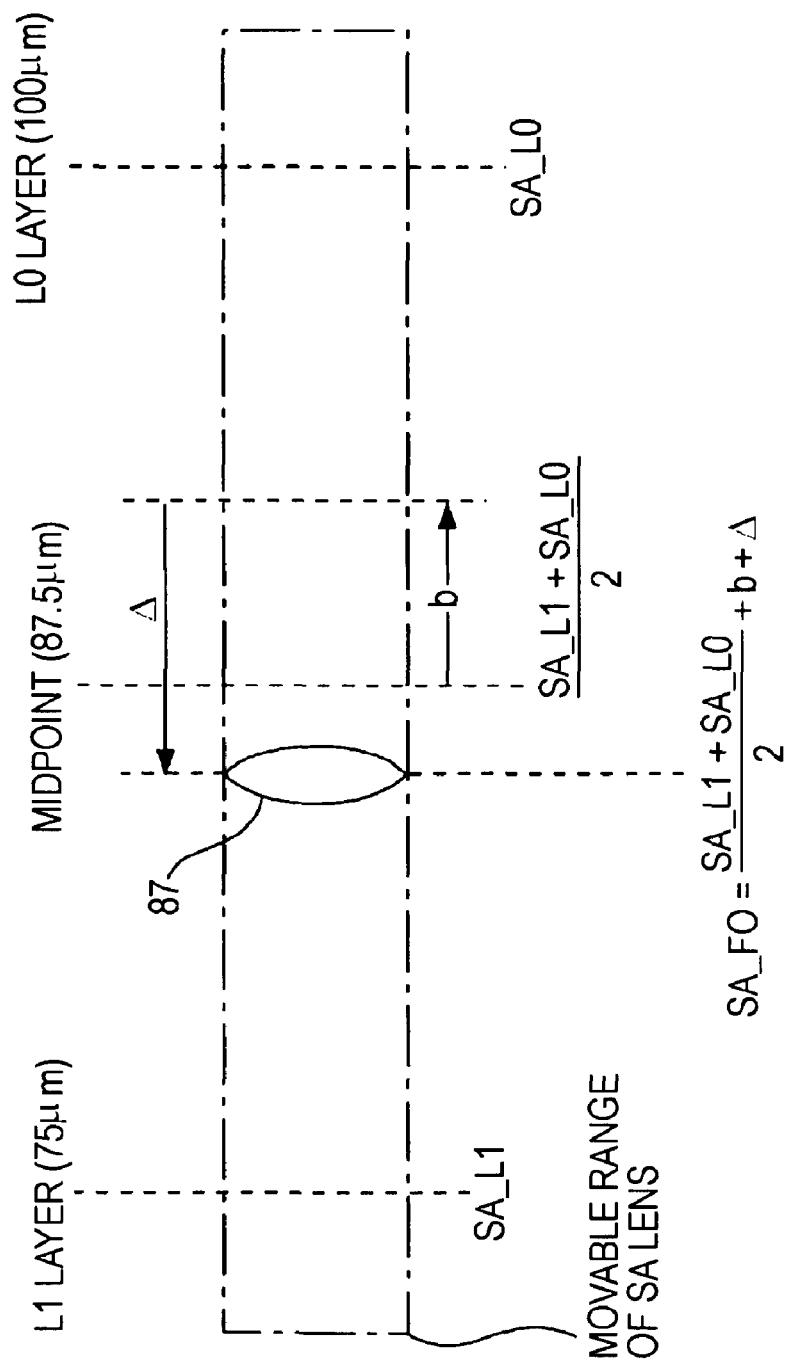
FIG. 7 illustrates how to perform a focusing operation according to another embodiment of the present invention.

FIG. 7 illustrates how to perform the focusing operation in consideration of the decrease in the amplitude of the focus error signal FE. As in the example shown in FIG. 5, FIG. 7 schematically shows the relationship between the movable range of the spherical aberration correction lens 87 shown in FIG. 3 (a movable range of SA lens indicated by a dotted-chain line in FIG. 7) and the spherical aberration correction value for the L1 layer (the initial value SA_L1), the spherical aberration correction value for the L0 layer (the initial value SA_L0), and the spherical aberration correction value for the midpoint (SA_L1+SA_L0/2).

In the example shown in FIG. 7, the spherical aberration correction value SA_F0 to be set in the focusing operation on the target L0 layer is set to a value given by shifting the spherical aberration correction value (SA_L1+SA_L0/2) for the midpoint on the basis of the correction shift value b and a predetermined offset value Δ.

Specifically, the spherical aberration correction value SA_F0 is set to a value calculated by SA_L1+SA_L0/2+b+Δ.

The offset value Δ is set to a value with which the decrease in the amplitude of the focus error signal FE involved in the adoption of the multiple-wavelength optical pickup of monocular type can be reduced. The value is determined on the basis of, for example, a measurement result of the amplitudes of the focus error signal FE when the spherical aberration correction value is varied. The determined value is preset in the disk drive apparatus in a predetermined stage, for example, before shipment.

Shifting the spherical aberration correction value for the midpoint on the basis of the offset value Δ can reduce the decrease in the amplitude of the focus error signal FE arising when the multiple-wavelength optical pickup of monocular type is adopted, thus further stabilizing the focusing operation on the L0 layer.

Figure 8:
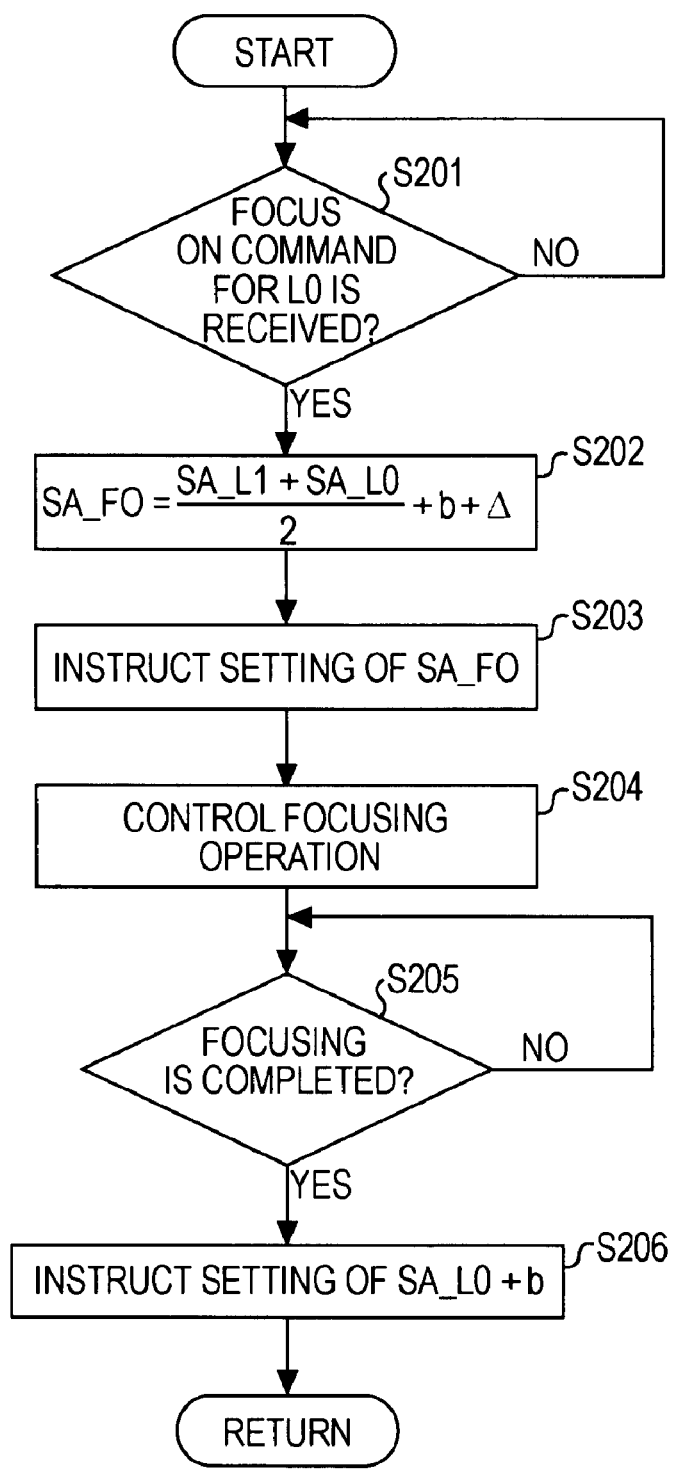
FIG. 8 is a flowchart showing an example of a process for realizing the focusing operation shown in FIG. 7.

FIG. 8 is a flowchart showing an example of a process for realizing the focusing operation shown in FIG. 7. The process shown in FIG. 8 is performed by the system controller 10 shown in FIG. 1 in accordance with programs stored in, for example, the ROM in the system controller 10. It is presumed that the correction shift value b is calculated in advance by the automatic adjustment of the spherical aberration correction value before starting the process shown in FIG. 8.

Referring to FIG. 8, in Step S201, the system controller 10 waits for a focus ON command for the L0 layer, as in Step S101 in FIG. 6. If the system controller 10 receives the focus ON command for the L0 layer, in Step S202, the system controller 10 calculates SA_F0=SA_L1+SA_L0/2+b+Δ by using the offset value Δ set in advance in the system controller 10.

Steps S203 to S206 are performed in the same manner as in Steps S103 to S106 shown in FIG. 6.

FIGS. 9A and 9B are graphs used for verifying the effectiveness of the method shown in FIG. 7. FIG. 9A shows the waveforms of the pull-in signal PI and the focus error signal FE when the spherical aberration correction value SA_F0 is set by the method shown in FIG. 5. FIG. 9B shows the waveforms of the pull-in signal PI and the focus error signal FE when the spherical aberration correction value SA_F0 is set by the method shown in FIG. 7.

In the graphs shown in FIGS. 9A and 9B, the vertical axis represents the level of the amplitude. The waveforms on the right side of the central scale are generated when the objective lens 84 is moved toward the optical disc D, and the waveforms on the left side of the central scale are generated when the objective lens 84 is moved in the direction away from the optical disc.

As shown by elliptical areas in FIGS. 9A and 9B, the levels of the amplitude of the focus error signal FE on both the L0 layer and the L1 layer when the spherical aberration correction value SA_F0 is set by the method shown in FIG. 7 are higher than the ones when the spherical aberration correction value SA_F0 is set by the method shown in FIG. 5.

This shows that the focusing operation on the L0 layer can be more stably performed when the method shown in FIG. 7 is adopted.

As described above, the higher amplitude of the focus error signal FE is generated when the spherical aberration correction value is shifted on the basis of the predetermined offset value Δ. This is because the correction shift value b providing the highest evaluation value of the quality of the playback signal (the highest amplitude of the RF signal) is not necessarily advantageous to the focusing servo control.

In other words, in the method shown in FIG. 7, the addition of the offset value Δ allows the spherical aberration correction value to be shifted in the direction desired for the focusing servo control. As a result, it is possible to increase the amplitude of the focus error signal FE, thereby realizing the stable focusing operation.

Although the offset value Δ is set to a value with which the decrease in the amplitude of the focus error signal FE can be reduced in the above description, it is also possible to equalize the upper and lower levels of the S-shaped curve of the focus error signal FE depending on the offset value Δ that is set. Specifically, if it is not possible to optimize the shape of the spots on the photodetector due to a variation in manufacturing of the optical pickup 1, the upper and lower levels of the S-shaped curve on the recording layer on which the spherical aberration is not optimally corrected may not be equalized. In order to resolve this problem, the spherical aberration correction value can be shifted in a predetermined direction by a desired amount by adding the offset value A to equalize the upper and lower levels of the S-shaped curve.

Although the setting of the spherical aberration correction value SA_F0 in the focusing operation is described above, it is possible to stabilize the focus jump operation by setting a spherical aberration correction value in the focus jump operation in a similar manner.

The stabilization of the focus jump operation will now be described.

Figure 10:
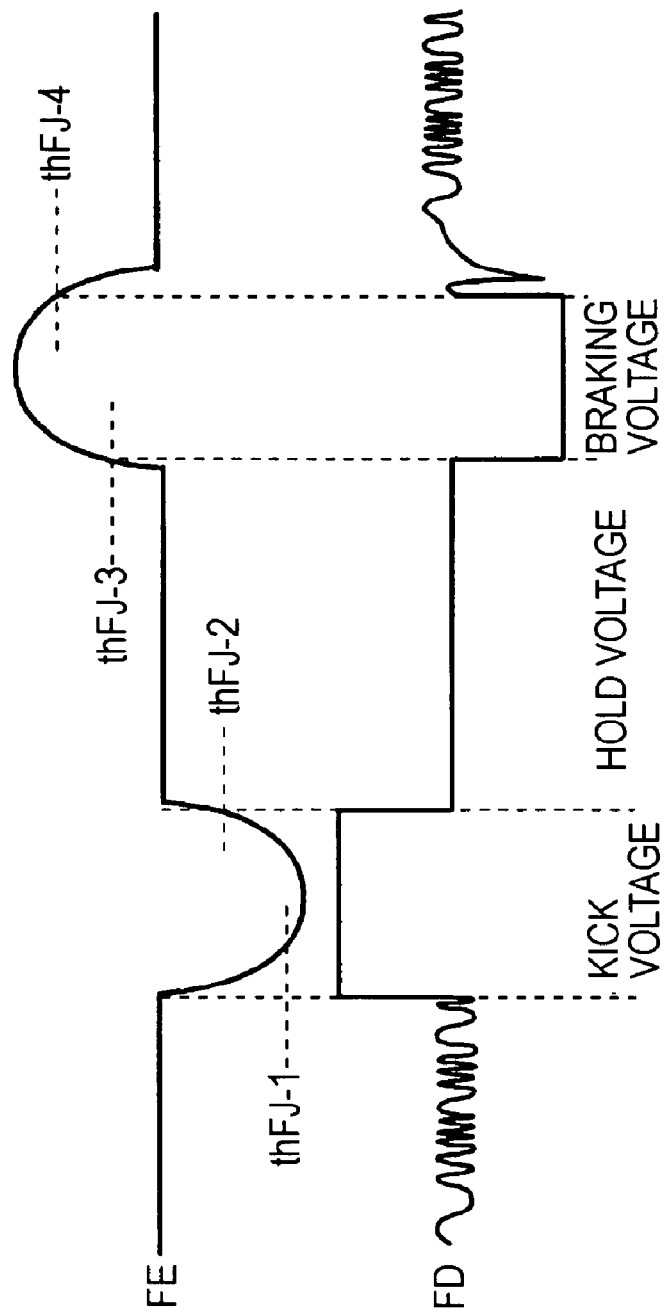
FIG. 10 shows how to perform a focus jump operation in related art.

FIG. 10 shows how to perform the focus jump operation in the related art. FIG. 10 schematically shows the focus jump operation targeted for the L0 layer by using the focus error signal FE, the focus drive signal FD, and various threshold values set for the focus error signal FE.

In the focus jump operation from the L1 layer to the L0 layer, the terminal t2 is switched to the terminal t3 in the switch SW in the servo circuit 11 shown in FIG. 4 to turn off the focus servo loop and the kick voltage is applied as the fixed voltage 23.

In response to the application of the kick voltage, the objective lens 84 is started to be driven toward the optical disc D and the waveform in one direction (the waveform in the direction in which the amplitude is decreased) of the S-shaped curve of the focus error signal FE is generated on the L1 layer, as shown in FIG. 10.

In the servo circuit 11, threshold values thFJ-1 and thFJ-2 are set in advance for the waveform of the focus error signal FE generated in response to the application of the kick voltage. When the amplitude of the focus error signal FE exceeds the threshold value thFJ-2 after it becomes lower than the threshold value thFJ-1, the hold voltage is applied instead of the kick voltage. In other words, if the above condition is satisfied, the terminal t3 is switched to the terminal t4 in the switch SW to apply the hold voltage 24.

Since the movement state of the objective lens 84 toward the optical disc D is kept while the hold voltage 24 being applied, the waveform in the other direction (the waveform in the direction in which the amplitude is increased) of the S-shaped curve of the focus error signal FE is generated on the L0 layer after a predetermined time. In the servo circuit 11, threshold values thFJ-3 and thFJ-4 are set for the waveform for the L0 layer. When the amplitude of the focus error signal FE exceeds the threshold value thFJ-3, the terminal t4 is switched to the terminal t3 in the switch SW to start application of the brake voltage having the polarity opposite to that of the fixed voltage 23. When the amplitude of the focus error signal FE becomes lower than the threshold value thFJ-4, the terminal t3 is switched to the terminal t2 in the switch SW to perform the focus servo control on the L0 layer. The focus jump operation from the L1 layer to the L0 layer is performed in the above manner.

Although the focus jump operation from the L1 layer to the L0 layer is exemplified with reference to FIG. 10, the focus jump operation from the L0 layer to the L1 layer can be performed in a similar manner on the basis of the focus error signal FE and various threshold values set for the focus error signal FE.

In the related art, the focus jump operation is performed with the spherical aberration correction value appropriate for the target layer being set so that the focus servo control is stably performed on the target layer.

However, if the focus jump operation to the L0 layer is started with the spherical aberration correction value appropriate for the target layer being set, as in the above example, the focus servo control becomes very unstable on the L1 layer to which the focusing is to be jumped and the focus servo control can be released in the worst case.

In addition, when the spherical aberration correction value appropriate for the target layer is set, the amplitude of the focus error signal FE can be decreased on the layer to which the focusing is to be jumped and the condition based on the threshold values thFJ-1 and thFJ-2 may not be established. As a result, the focus jump operation is not possibly performed.

It is not possible to stabilize the focus jump operation by the method in the related art in which the spherical aberration correction value appropriate for the target layer is set.

Even in the above method in the related art, it will be effective to set the spherical aberration correction value to a value appropriate for the midpoint between the L1 layer and the L0 layer to eliminate the distortion of the focus error signal FE. However, also in this case, in view of the characteristics shown in FIGS. 14A to 14C, it is preferred that the correction shift value b calculated by the automatic adjustment of the spherical aberration correction value be added to the spherical aberration correction value (SA_L1+SA_L0/2) for the midpoint.

According to an embodiment of the present invention, a spherical aberration correction value SA_FJ to be set in the focus jump operation is set to a value calculated by SA_L1+SA_L0/2+b, and the focus jump operation is performed with this spherical aberration correction value SA_FJ being set.

Figure 11:
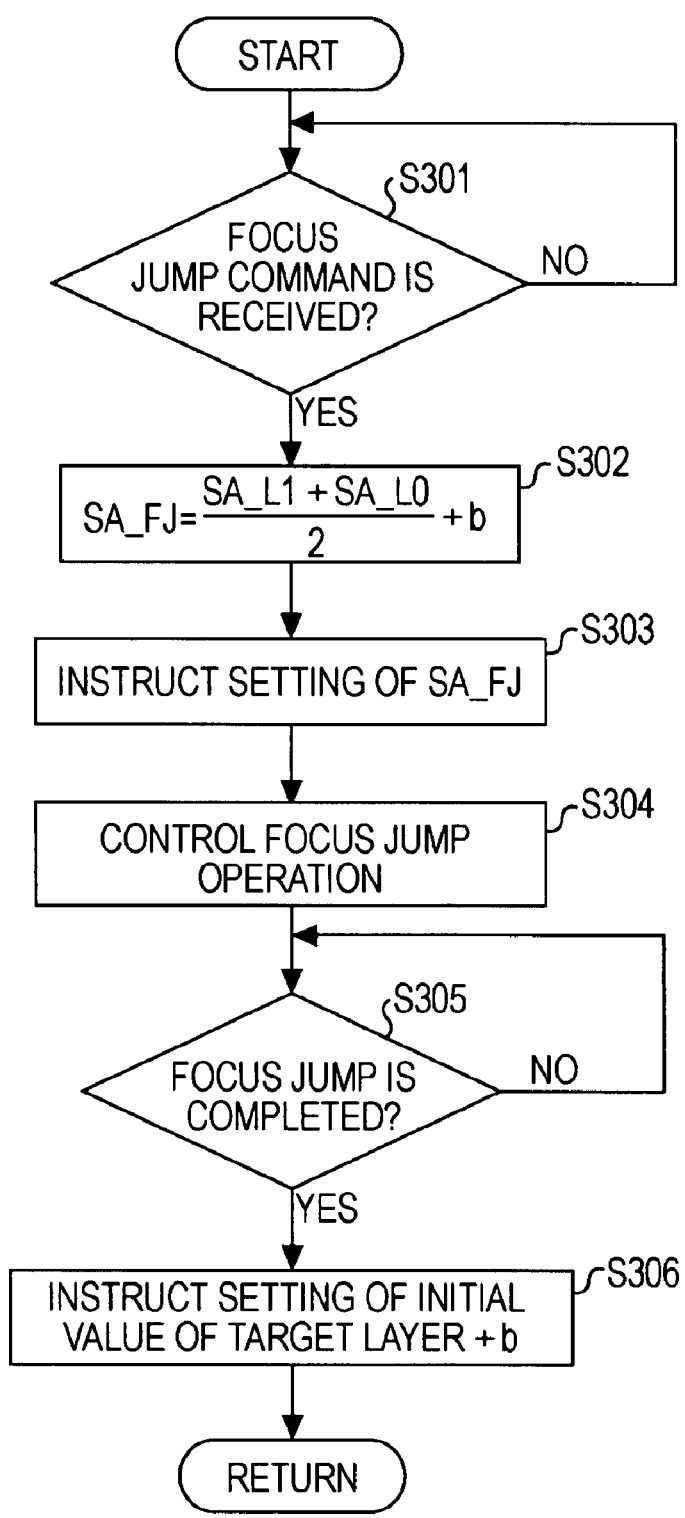
FIG. 11 is a flowchart showing an example of a process for realizing the focus jump operation according to an embodiment of the present invention.

FIG. 11 is a flowchart showing an example of a process for realizing the focus jump operation according to the embodiment of the present invention. The process shown in FIG. 11 is performed by the system controller 10 shown in FIG. 1 in accordance with programs stored in, for example, the ROM in the system controller 10. It is presumed that the correction shift value b is calculated in advance by the automatic adjustment of the spherical aberration correction value before starting the process shown in FIG. 11.

Referring to FIG. 11, in Step S301, the system controller 10 waits for a focus jump instruction from the host apparatus 100 as a focus jump command.

If the system controller 10 receives the focus jump instruction, in Step S302, the system controller 10 calculates SA_FJ=SA_L1+SA_L0/2+b.

In Step S303, the system controller 10 instructs the servo circuit 11 to set the calculated spherical aberration correction value SA_FJ in the SA correction driver 14. In Step S304, the system controller 10 instructs the servo circuit 11 to perform the focus jump operation described with reference to FIG. 10.

In Step S305, the system controller 10 waits for an indication of completion of the focus jump operation from the servo circuit 11. If the system controller 10 receives the indication of completion of the focus jump operation, in Step S306, the system controller 10 instructs the servo circuit 11 to set the initial value of the target layer+b. Specifically, if the focus jump instruction is targeted for the L0 layer, the system controller 10 instructs the servo circuit 11 to set a value SA_L0+b given by adding the correction shift value b to the initial value SA_L0 for the L0 layer in the SA correction driver 14. If the focus jump instruction is targeted for the L1 layer, the system controller 10 instructs the servo circuit 11 to set a value SA_L1+b given by adding the correction shift value b to the initial value SA_L1 for the L1 layer in the SA correction driver 14.

Accordingly, after the focus jump to the target layer is completed, it is possible to set the spherical aberration correction value optimal for the target layer and to read out signals with the optimal spherical aberration correction value being set.

According to the embodiment of the present invention described above, the focus jump operation to each layer can be stably performed even if the difference in the thickness of the cover layers between the optical discs arises.

Also in the focus jump operation, shifting the spherical aberration correction value on the basis of the offset value Δ, as in the method shown in FIG. 7, can lend stability to the difference in the thickness of the cover layers between the optical discs and stability to the decrease in the amplitude of the focus error signal FE when the multiple-wavelength optical pickup of monocular type is adopted.

Although the embodiments of the present invention are described above, the present invention is not limited to the specific examples described above.

For example, although the focusing operation and the focus jump operation targeted for the second recording layer other than the first recording layer closest to the side which a laser light beam is incident on, among two recording layers, are described above, the present invention is applicable to the focusing operation and the focus jump operation targeted for any recording layer other than the first recording layer, among three or more recording layers.

Specifically, also when the optical disc has three or more recording layers, performing the focusing operation on the target layer in the state in which the spherical aberration correction value is set to a value given by shifting the spherical aberration correction value appropriate for the midpoint between the first recording layer and the target layer by a desired value can accommodate the variation in the thickness of the cover layers and the decrease in the amplitude of the focus error signal when the multiple-wavelength optical pickup of monocular type is adopted.

Also in the focus jump operation, when the optical disc has three or more recording layers, setting the spherical aberration correction value to a value given by shifting the spherical aberration correction value appropriate for the midpoint between the first recording layer and the target layer by a desired value can achieve the advantages similar to the ones when the optical disc has the two recording layers.

Although the spherical aberration correction mechanism includes the movable lens 87 in the above description, the spherical aberration correction mechanism may include, for example, a liquid crystal panel.

When the spherical aberration correction mechanism includes a liquid crystal panel, the drive signal Sd used for instructing a certain cell in the liquid crystal panel to apply voltage is supplied to a liquid crystal driver. In this case, the correction shift value b and the offset value Δ are converted by using a shield factor, and the number of cells to which the voltage is applied is controlled so as to vary the shield factor in accordance with addition or subtraction of the correction shift value b or the offset value A.

Although the amplitude of the RF signal is used as the evaluation value in the calculation of the correction shift value and the matrix circuit 4 generating the RF signal and the A/D converter 15 form an evaluation value generating unit in the above description, a jitter value may be used as the evaluation value in the calculation of the correction shift value. Alternatively, when Partial Response Maximum Likelihood (PRML) is adopted in the binarization of the RF signal, for example, an evaluation value of a different matrix (a difference from an ideal value or a deviation value) may be used. In such a case, an evaluator for generating the evaluation value may be provided in the data signal processing circuit 5.

The evaluation value used for calculating the correction shift value is not limited to the ones described above. Any evaluation value may be used as long as the evaluation value is generated on the basis of information about a light beam reflected from a recording medium and serves as an evaluation index of the quality of the playback signal.

Although the optical recording medium driving apparatus supporting the optical recording medium of a disc shape is described above, the present invention is applicable to other optical recording medium driving apparatuses that record and/or play back signals on recording media by using light radiation.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium driving apparatus that records and/or plays back data on an optical recording medium having a plurality of recording layers, the apparatus comprising:
   head means for radiating laser light on the optical recording medium and detecting reflected light from the optical recording medium at least to read out a signal, the head means having at least a mechanism of focusing the laser light and a spherical aberration correction mechanism;
   focusing control means for driving the focusing mechanism based on the reflected light detected by the head means to perform focusing control on each recording layer of the plurality of recording layers on the optical recording medium;
   spherical aberration correcting means for driving the spherical aberration correction mechanism based on a spherical aberration correction value to correct spherical aberration; and
   control means for, when a condition for a focusing operation targeted for a target layer of the plurality of recording layers other than a first recording layer most proximal to a side on which the laser light is incident is satisfied, controlling the focusing control means so as to set the spherical aberration correction value given by shifting the spherical aberration correction value appropriate for a midpoint between the target layer and the first recording layer by a desired value in the spherical aberration correcting means and controlling the focusing control means so as to perform focusing control on the target layer with the spherical aberration correction value resulting from the shift being set.

2. The optical recording medium driving apparatus according to claim 1, further comprising:
   evaluation value generating means for generating an evaluation value used as an evaluation index of the quality of a playback signal based on the reflected light detected by the head means,
   wherein, when the condition for the focusing operation on a predetermined recording layer on the optical recording medium is satisfied for a first time, the control means acquires a correction shift value corresponding to the difference between an initial value of the spherical aberration correction value set in advance for the predetermined recording layer and the spherical aberration correction value providing a predetermined evaluation value among the evaluation values that are generated by the evaluation value generating means by varying the spherical aberration correction value with respect to the initial value, and
   wherein, when the condition for the focusing operation targeted for the target layer other than the first recording layer is satisfied, the control means controls the focusing control means so as to set the spherical aberration correction value given by shifting the spherical aberration correction value appropriate for the midpoint between the target layer and the first recording layer by the correction shift value in the spherical aberration correcting means.

3. The optical recording medium driving apparatus according to claim 1,
   wherein, when the condition for the focusing operation targeted for the target layer other than the first recording layer is satisfied, the control means controls the focusing control means so as to set the spherical aberration correction value given by shifting the spherical aberration correction value appropriate for the midpoint between the target layer and the first recording layer based on a predetermined offset value in the spherical aberration correcting means.

4. The optical recording medium driving apparatus according to claim 2,
   wherein, when the condition for the focusing operation targeted for the target layer other than the first recording layer is satisfied, the control means controls the focusing control means so as to set the spherical aberration correction value given by shifting the spherical aberration correction value appropriate for the midpoint between the target layer and the first recording layer based on the correction shift value and a predetermined offset value in the spherical aberration correcting means.

5. The optical recording medium driving apparatus according to claim 1,
   wherein the focusing control means is configured to perform focus jump control to each recording layer of the plurality of recording layers on the optical recording medium, and
   wherein, when a condition for a focus jump operation is satisfied, the control means controls the focusing control means so as to set the spherical aberration correction value given by shifting the spherical aberration correction value appropriate for the midpoint between the target layer and the first recording layer by the desired value in the spherical aberration correcting means and controls the focusing control means so as to perform the focus jump control with the spherical aberration correction value resulting from the shift being set.

6. A focusing method in an optical recording medium driving apparatus that records and/or plays back data on an optical recording medium having a plurality of recording layers, the optical recording medium driving apparatus including head means for radiating laser light on the optical recording medium and detecting reflected light from the optical recording medium at least to read out a signal, the head means having at least a mechanism of focusing the laser light and a spherical aberration correction mechanism; focusing control means for driving the focusing mechanism based on the reflected light detected by the head means to perform focusing control on each recording layer of the plurality of recording layers on the optical recording medium; and spherical aberration correcting means for driving the spherical aberration correction mechanism based on a spherical aberration correction value to correct spherical aberration, the method comprising the steps of:

controlling, when a condition for a focusing operation targeted for target layer of the plurality of recording layers other than a first recording layer most proximal to a side on which the laser light is incident is satisfied, the focusing control means so as to set the spherical aberration correction value given by shifting the spherical aberration correction value appropriate for a midpoint between the target layer and the first recording layer by a desired value in the spherical aberration correcting means; and controlling the focusing control means so as to perform focusing control on the target layer with the spherical aberration correction value resulting from the shift being set.

7. An optical recording medium driving apparatus that records and/or plays back data on an optical recording medium having a plurality of recording layers, the apparatus comprising:

a head unit configured to radiate laser light on the optical recording medium and to detect reflected light from the optical recording medium at least to read out a signal, the head unit having at least a mechanism of focusing the laser light and a spherical aberration correction mechanism;

a focusing control unit configured to drive the focusing mechanism based on the reflected light detected by the head unit to perform focusing control on each recording layer of the plurality of recording layers on the optical recording medium;

a spherical aberration correcting unit configured to drive the spherical aberration correction mechanism based on a spherical aberration correction value to correct spherical aberration; and a control unit, when a condition for a focusing operation targeted for a target layer of the plurality of recording layers other than a first recording layer most proximal to a side on which the laser light is incident is satisfied, controls the focusing control unit so as to set the spherical aberration correction value given by shifting the spherical aberration correction value appropriate for a midpoint between the target layer and the first recording layer by a desired value in the spherical aberration correcting unit and controls the focusing control unit so as to perform focusing control on the target layer with the spherical aberration correction value resulting from the shift being set.

* * * * *